United States Patent
Cho et al.

(10) Patent No.: US 10,409,368 B2
(45) Date of Patent: Sep. 10, 2019

(54) EYE-GAZE DETECTION SYSTEM, DISPLACEMENT DETECTION METHOD, AND DISPLACEMENT DETECTION PROGRAM

(71) Applicant: FOVE, INC., San Mateo, CA (US)

(72) Inventors: Juahn Cho, Tokyo (JP); Lochlainn Wilson, Tokyo (JP)

(73) Assignee: FOVE, INC., San Mateo, CA (US)

( * ) Notice: Subject to any disclaimer, the term of this patent is extended or adjusted under 35 U.S.C. 154(b) by 110 days.

(21) Appl. No.: 15/661,467

(22) Filed: Jul. 27, 2017

(65) Prior Publication Data
US 2018/0032133 A1     Feb. 1, 2018

(30) Foreign Application Priority Data

Jul. 27, 2016   (JP) ................................. 2016-147519
Jul. 25, 2017   (JP) ................................. 2017-143702

(51) Int. Cl.
*G06F 3/01*     (2006.01)
*G06T 7/70*     (2017.01)
*G06K 9/00*     (2006.01)
*H04N 5/225*    (2006.01)
(Continued)

(52) U.S. Cl.
CPC ......... *G06F 3/013* (2013.01); *G06K 9/00604* (2013.01); *G06T 7/70* (2017.01); *G06T 7/73* (2017.01); *G06T 7/80* (2017.01); *H04N 5/2256* (2013.01); *G06T 2207/10021* (2013.01); *G06T 2207/10048* (2013.01); *G06T 2207/20061* (2013.01); *G06T 2207/30041* (2013.01); *G06T 2207/30208* (2013.01)

(58) Field of Classification Search
CPC .. G06F 3/013; G06K 9/00604; H04N 5/2256; G06T 7/80; G06T 7/73; G06T 7/70; G06T 2207/10021; G06T 2207/10048; G06T 2207/20061; G06T 2207/30041; G06T 2207/30208
See application file for complete search history.

(56) References Cited

U.S. PATENT DOCUMENTS 7,414,791 B2 *   8/2008   Urakawa .............. A61B 3/0008
                                                  348/239
7,538,744 B1 *   5/2009   Liu ........................ G06F 3/013
                                                  345/7
(Continued)

*Primary Examiner* — John R Schnurr
(74) *Attorney, Agent, or Firm* — Venable LLP; Adam R. Hess; Laura G. Remus

(57) ABSTRACT

An eye-gaze detection system containing a mounting tool mounted on a user for use, includes: plural illumination units illuminating an eye of the user with invisible light; a camera capturing the eye on the basis of the invisible light; a pupil specifying unit specifying a pupil center of the user from a captured image having been captured; an obtaining unit obtaining information on a position of a center of a corneal curvature of the user on the basis of disposed positions of the illumination units and the camera, and illuminated positions by illumination light emitted from the illumination units to the eye; a vector specifying unit specifying a vector connecting the center of the corneal curvature and the pupil center on the captured image; and a displacement detection unit detecting displacement of a mounting state of the mounting tool mounted on the user on the basis of the vector.

8 Claims, 14 Drawing Sheets

(51) Int. Cl.
*G06T 7/80* (2017.01)
*G06T 7/73* (2017.01)

(56) References Cited

U.S. PATENT DOCUMENTS

| | | | |
|---|---|---|---|
| 2005/0175218 A1* | 8/2005 | Vertegaal | A61B 3/113 |
| | | | 382/103 |
| 2014/0043229 A1* | 2/2014 | Higaki | G06F 3/013 |
| | | | 345/156 |
| 2016/0029883 A1* | 2/2016 | Cox | G06F 3/013 |
| | | | 351/209 |
| 2016/0029938 A1* | 2/2016 | Shudo | A61B 3/107 |
| | | | 600/558 |
| 2016/0085299 A1* | 3/2016 | Horesh | G06F 3/013 |
| | | | 345/156 |
| 2018/0039327 A1* | 2/2018 | Noda | G03B 13/06 |
| 2018/0235466 A1* | 8/2018 | Hakoshima | A61B 3/113 |
| 2018/0239427 A1* | 8/2018 | Hakoshima | A61B 3/113 |
| 2018/0267323 A1* | 9/2018 | Tsurumi | G02B 27/02 |

* cited by examiner

EYE-GAZE DETECTION SYSTEM, DISPLACEMENT DETECTION METHOD, AND DISPLACEMENT DETECTION PROGRAM

CROSS-REFERENCE TO RELATED APPLICATION

This application is based on and claims priority under 35 USC 119 to Japanese Patent Application Nos. 2016-147519 filed Jul. 27, 2016 and 2017-143702 filed Jul. 25, 2017.

BACKGROUND

Technical Field

The present invention relates to an eye-gaze detection system, and in particular, to an eye-gaze detection technique in which a head mounted display is used.

Related Art

Conventionally, eye-gaze detection to specify a point at which a user gazes is performed by obtaining basic information of user's gaze through calibration in advance. The patent document 1 discloses a technique in which calibration is made and an eye-gaze detection is performed.

In recent years, eye-gaze detection has been attempted to be performed also in a head mounted display or display glasses which are mounted on a head of a user for use. Also in these cases, the eye-gaze detection is to be performed after the aforementioned calibration.

CITATION LIST

Patent Literature

[PTL 1] Japanese Patent Application Laid-open Publication No. 2001-134371

SUMMARY

Technical Problem

However, this is based on the premise that the relative positional relationship between the user and the head mounted display or display glasses does not vary. Thus, for example, in the case where the head mounted display is physically displaced in use as shown in FIG. 13, a problem has occurred in which accuracy of the position detected by the eye-gaze detection is lowered. Thus, detecting the displacement of the mounting state in which the head mounted display is mounted to the user is important to solve the problem and to find that the accuracy in the eye-gaze detection is lowered. The example shown in FIG. 13 illustrates the situation in which a head mounted display 100 mounted on a head of a user has been displaced upward from the state shown with dotted lines 150t1 to the state shown with solid lines 150t2. Note that it is only one example of displacement, and the situations in which it has been displaced downward, and one side thereof has been displaced upward or downward are included in displacement. In any situation of the displacement, the problem occurs in which accuracy of the detected position in eye-gaze detection is lowered. Accordingly, a technique to detect the displacement is desired to be developed.

The present invention is achieved in view of such a problem, and an object thereof is to provide an eye-gaze detection system that is capable of detecting displacement of a mounting tool mounted on a head of a user for use, such as a head mounted display, in the case of the displacement thereof occurs.

Solution to Problem

In order to solve the above problem, according to an aspect of the present invention, there is provided an eye-gaze detection system containing a mounting tool mounted on a user for use, including: a plurality of illumination units configured to illuminate an eye of the user with invisible light; a camera configured to capture the eye of the user on the basis of the invisible light; a pupil specifying unit configured to specify a pupil center of the user from a captured image that has been captured by the camera; an obtaining unit configured to obtain information on a position of a center of a corneal curvature of the user on the basis of disposed positions of the plurality of illumination units, illuminated positions by illumination light emitted from the plurality of illumination units to the eye of the user, and a disposed position of the camera; a vector specifying unit configured to specify a vector connecting the center of the corneal curvature of the user and the pupil center on the captured image; and a displacement detection unit configured to detect displacement of a mounting state of the mounting tool mounted on the user on the basis of the vector.

The eye-gaze detection system may further include: a storing unit configured to store disposed information indicating disposed positions of the plurality of illumination units and the camera. The obtaining unit may obtain the information on the position of the center of the corneal curvature of the user on the basis of disposed information of a first illumination unit among the plurality of the illumination units stored in the storing unit, a first illuminated position with respect to the eye of the user illuminated by the first illumination unit with invisible light, disposed information of a second illumination unit different from the first illumination unit among the plurality of illumination units stored in the storing unit, second illuminated position with respect to the eye of the user illuminated by the second illumination unit with invisible light, and the disposed position of the camera.

In the eye-gaze detection system, the obtaining unit may obtain, as the information on the position of the center of the corneal curvature of the user, an intersection line between a first plane and a second plane, the first plane containing a first vector from a center position of the camera to the first illumination unit and a second vector from the center position of the camera to the first illuminated position, the second plane containing a third vector from the center position of the camera to the second illumination unit and a fourth vector from the center position of the camera to the second illuminated position.

In the eye-gaze detection system, the vector specifying unit may specify the vector by setting an intersection point between the intersection line and an image sensor of the camera as the center of the corneal curvature of the user on the captured image.

In the eye-gaze detection system, the displacement detection unit may detect displacement in a case where a position of the first vector specified as the vector at first time by the vector specifying unit and a position of the second vector specified as the vector by the vector specifying unit at second time within predetermined time from the first time are located on different positions.

In the eye-gaze detection system, the mounting tool may be a head mounted display.

The eye-gaze detection system may further include an eye-gaze detection apparatus. The mounting tool may include: the plurality of illumination units; the camera; and a transmission unit configured to transmit the captured image to the eye-gaze detection apparatus, and the eye-gaze detection apparatus may include: a receiving unit configured to receive the captured image; the pupil specifying unit; the obtaining unit; the vector specifying unit; and the displacement detection unit.

In the eye-gaze detection system, the mounting tool may further include a display unit configured to present an image to a user, and the eye-gaze detection apparatus may further include an eye-gaze detection unit configured to detect a gaze position of the user gazing at the image on the basis of the captured image.

In the eye-gaze detection system, the eye-gaze detection apparatus may further include a correction unit configured to correct the gaze position of the user detected by the eye-gaze detection unit, on the basis of the displacement detected by the displacement detection unit.

According to another aspect of the present invention, there is provided a displacement detection method including: illuminating an eye of a user with invisible light by a plurality of illumination units; capturing the eye of the user on the basis of the invisible light using a camera; specifying a pupil center of the user from a captured image in the capturing; obtaining information on a position of a center of a corneal curvature of the user on the basis of disposed positions of the plurality of illumination units, illuminated positions by illumination light emitted from the plurality of illumination units to the eye of the user, and a disposed position of the camera; specifying a vector connecting the center of the corneal curvature of the user and the pupil center on the captured image; and detecting displacement of a mounting state of the mounting tool mounted on the user on the basis of the vector.

According to further aspect of the present invention, there is provided a non-transitory computer readable recording medium storing displacement detection program code instructions that are for displacement detection, and when the displacement detection program code instructions are executed by a computer, the displacement detection program code instructions cause the computer to perform: obtaining a captured image that has been captured by a camera configured to capture an eye of the user, on the basis of invisible light with which the eye of the user is illuminated by a plurality of illumination units; specifying a pupil center of the user from the captured image; obtaining information on a position of a center of a corneal curvature of the user on the basis of disposed positions of the plurality of illumination units, illuminated positions by illumination light emitted from the plurality of illumination units to the eye of the user and a disposed position of the camera; specifying a vector connecting the center of the corneal curvature of the user and the pupil center on the captured image; and detecting displacement of a mounting state of the mounting tool mounted on the user, on the basis of the vector.

Note that, any combinations of the aforementioned components, and the implementation of the present invention in the form of methods, apparatus, systems, computer programs, data structures, recording media, and the like may be effective as aspects of the present invention.

Advantageous Effects of Invention

According to the present invention, it is possible to provide a technique to detect displacement of the mounting state of a mounting tool represented as a head mounted display or the like.

DESCRIPTION OF EMBODIMENTS

Hereinafter, detailed description will be given of an eye-gaze detection system according to this invention with reference to the accompanying drawings.

Exemplary Embodiment 1

<Configuration>

Figure 1:
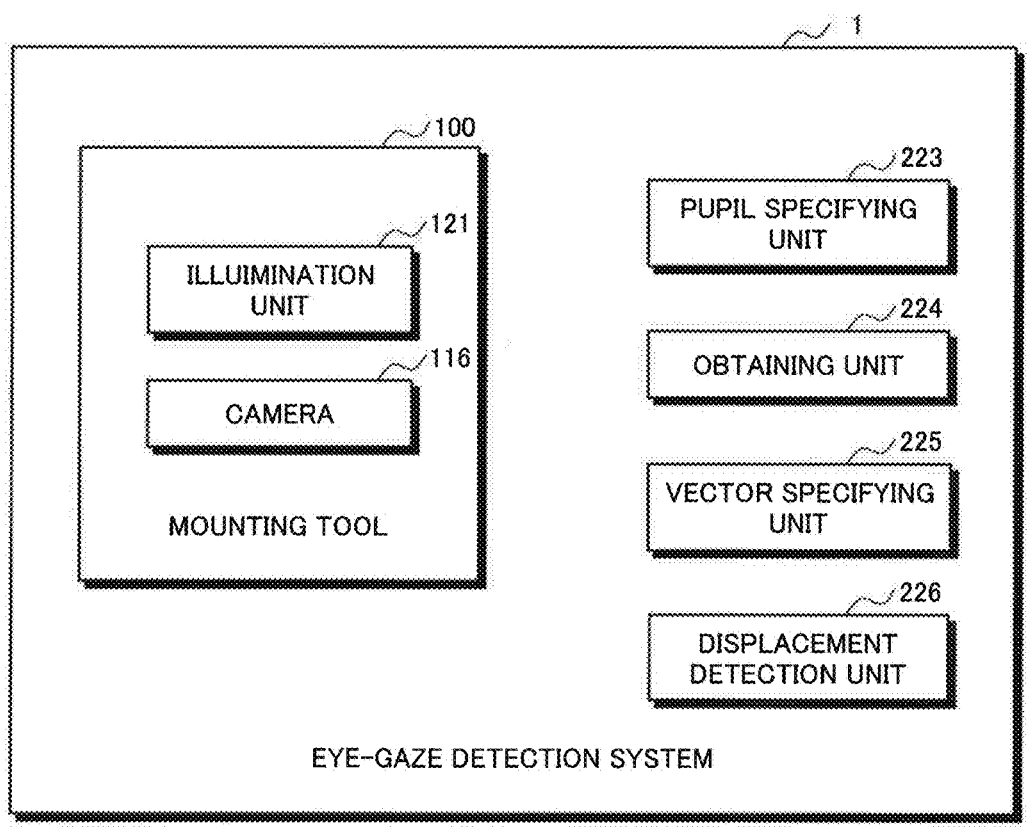
FIG. 1 is a diagram illustrating a configuration of an eye-gaze detection system.

As shown in FIG. 1, an eye-gaze detection system 1 according to the present invention includes a mounting tool 100.

The mounting tool 100 is a device to be mounted on a user for use, and a wearable terminal represented by a head mounted display or wear glasses, for example.

The eye-gaze detection system 1 includes an illumination unit 121, a camera 116, a pupil specifying unit 223, an obtaining unit 224, a vector specifying unit 225, and a displacement detection unit 226.

The illumination unit 121 illuminates an eye of a user on which the mounting tool has been mounted with invisible light. The illumination unit 121 contains plural illumination sources. The invisible light emitted from the illumination unit 121 is, for example, near-infrared light which does not affect the eye of the user adversely. The illumination source is a LED light, for example.

The camera 116 captures the eye of the user using the invisible light emitted from the illumination unit 121.

The pupil specifying unit 223 specifies the pupil center of the user from the captured image that has been captured by the camera 116. Here, it is only necessary that the pupil center is located on a position corresponding to the central position of the pupil of the user 300, and the center of gravity may be set instead of the center.

The obtaining unit 224 obtains information on the position of the center of the corneal curvature of the user on the basis of disposed positions of the plural illumination sources of the illumination unit 121, illuminated positions by the illumination light emitted from the plural illumination sources to the user's eye, and the arrangement of the camera 116. Although the center of the corneal curvature is described here, the position of the center of the gravity of the corneal curvature may be set instead thereof. The disposed positions and the illuminated positions may be coordinate information in which respective positions is specified in the eye-gaze detection system, or information indicating the direction and the distance from a basic position (for example, the origin set on the eye-gaze detection system). The corneal curvature of the user indicates the center of the circle (sphere) containing the arc (sphere) formed by the cornea of the user.

The vector specifying unit 225 specifies the vector connecting the pupil center and the center of the corneal curvature of the user on the captured image captured by the camera 116.

The displacement detection unit 226 detects displacement of a mounting state of a mounting tool 100 mounted on the user, on the basis of the vector specified by the vector specifying unit 225.

Hereinafter, detailed description will be further given of the eye-gaze detection system 1.

Figure 2:
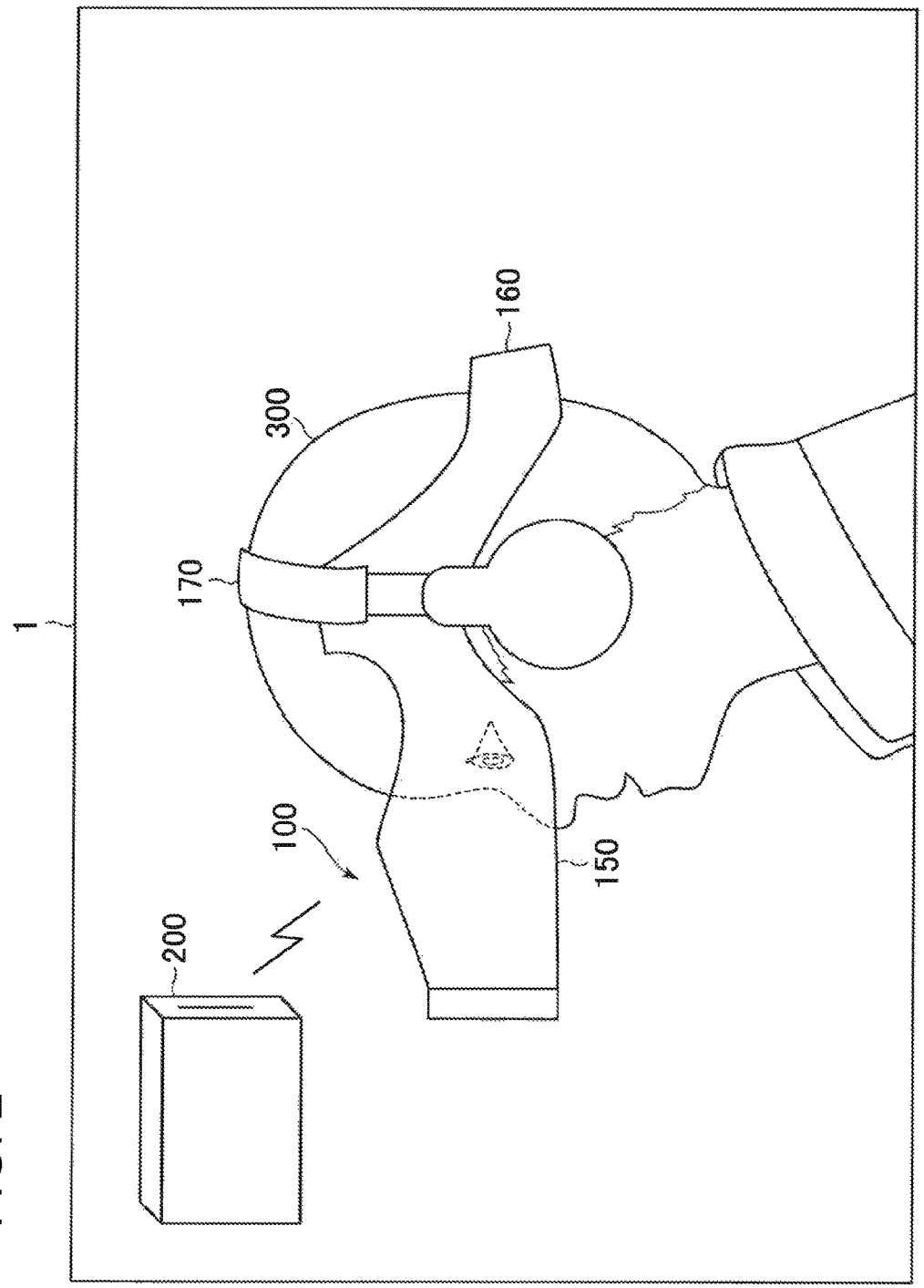
FIG. 2 is an overview illustrating the head mounted display mounted on the user.

FIG. 2 is a diagram schematically illustrating an overview of the eye-gaze detection system 1 according to the exemplary embodiment. The eye-gaze detection system 1 according to the exemplary embodiment includes a head mounted display 100 shown as an example of the mounting tool 100, and an eye-gaze detection apparatus 200. Hereinbelow, the mounting tool 100 is described as the head mounted display 100. As shown in FIG. 2, the head mounted display 100 is mounted on the head of the user 300 for use.

The eye-gaze detection apparatus 200 detects at least one of the gaze directions of the right eye and the left eye of the user on which the head mounted display 100 has been mounted, and specifies the focal point of the user, that is, the point at which the user gazes in the three-dimensional image displayed by the head mounted display. Further, the eye-gaze detection apparatus 200 functions as a video creation apparatus configured to create videos displayed on the head mounted display 100. Although not limited to the following, the eye-gaze detection apparatus 200 may be apparatus capable of reproducing videos, such as stationary game machines, portable game machines, PCs, tablets, smartphones, phablets, video players, and TVs, as an example. The eye-gaze detection apparatus 200 establishes wireless or wired connection with the head mounted display 100. In the example shown in FIG. 2, the eye-gaze detection apparatus 200 is wirelessly connected to the head mounted display 100. The wireless connection between the eye-gaze detection apparatus 200 and the head mounted display 100 is established by an already-known wireless communication technique such as Wi-Fi (registered trademark), or Bluetooth (registered trademark). Although not limited to the following, video transmission between the head mounted display 100 and the eye-gaze detection apparatus 200 is executed according to the standard such as Miracast (registered trademark), WiGig (registered trademark), or WHDI (registered trademark), for example.

Note that FIG. 2 illustrates an example of the case where the head mounted display 100 and the eye-gaze detection apparatus 200 are different apparatus. However, the eye-gaze detection apparatus 200 may be incorporated into the head mounted display 100.

The head mounted display 100 includes a housing 150, a fitting tool 160, and a headphone 170. The housing 150 contains an image display system to present videos to the user 300, such as an image display element, and a wireless transmission module such as a Wi-Fi module or a Bluetooth (registered trademark) module which is not shown in the figure. With the fitting tool 160, the head mounted display 100 is mounted on the head of the user 300. The fitting tool 160 is configured by, for example, a belt or a stretchable bandage. Once the user 300 wears the head mounted display 100 with the fitting tool 160, the housing 150 is disposed at the position where the eyes of the user 300 are covered. Thus, once the user 300 wears the head mounted display 100, the eye-sight of the user 300 is blocked by the housing 150.

The headphone 170 outputs audio of the video reproduced by the eye-gaze detection apparatus 200. The headphone 170 may not be fixed to the head mounted display 100. The user 300 may freely attach or detach the headphone 170 even in the state where the user wears the head mounted display 100 with the fitting tool 160.

Figure 3:
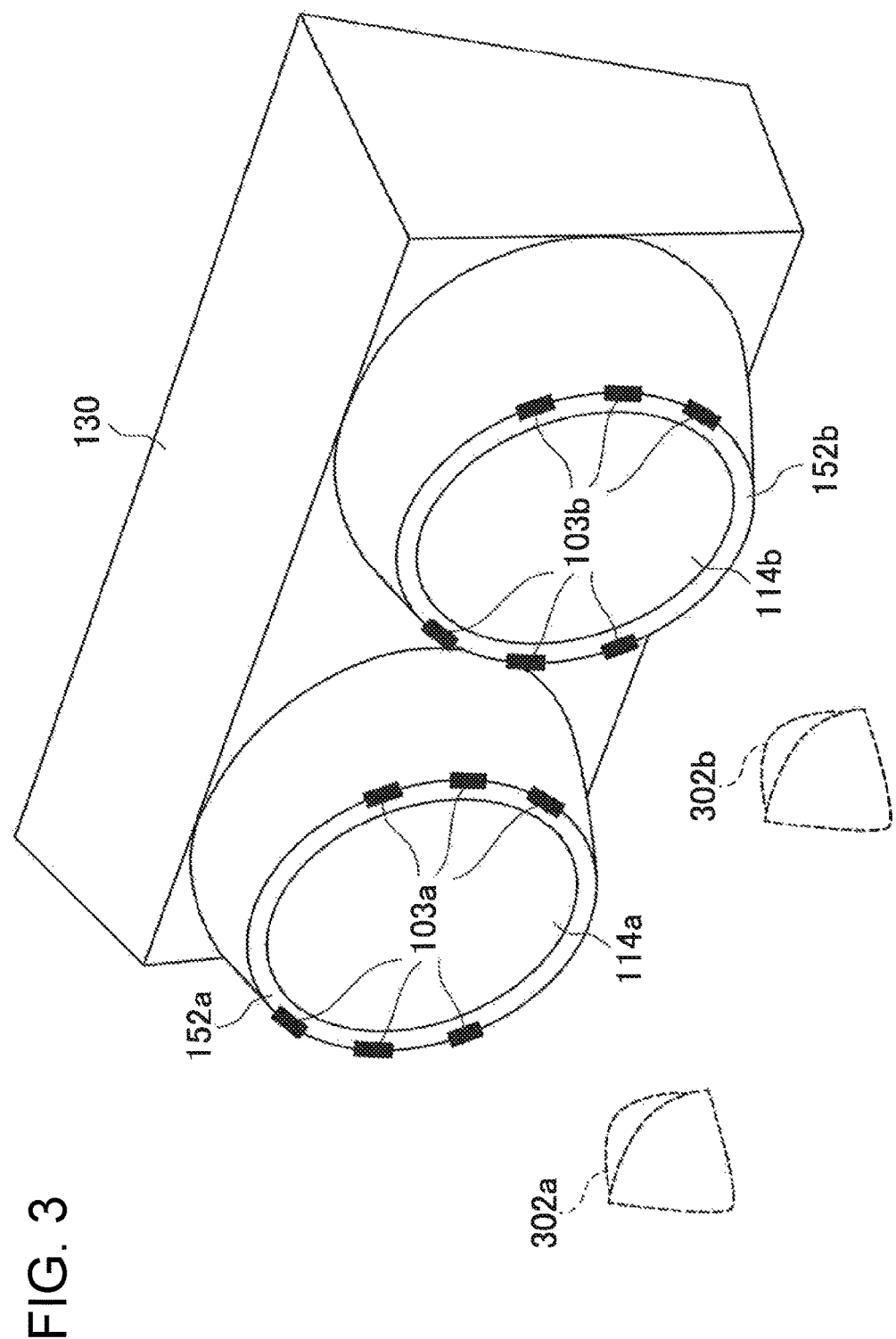
FIG. 3 is a perspective diagram in which the overview of the image display system of the head mounted display is schematically illustrated.

FIG. 3 is a perspective diagram in which the overview of the image display system 130 of the head mounted display 100 according to the exemplary embodiment is schematically illustrated. More specifically, FIG. 3 is the view showing the region facing the corneas 302 of the user 300 when the head mounted display 100 is mounted thereon, the region being in the housing 150 according to the exemplary embodiment.

As shown in FIG. 3, a convex lens 114a for the left eye is arranged so as to be located on the position facing the cornea 302a of the left eye of the user 300 when the user 300 wears the head mounted display 100. Similarly, a convex lens 114b for the right eye is arranged so as to be located on the position facing the cornea 302b of the right eye of the user 300 when the user 300 wears the head mounted display 100. The convex lens 114a for the left eye and the convex lens 114b for the right eye are held by a lens holder 152a for the left eye and a lens holder 152b for the right eye, respectively.

Hereinafter, each of the convex lens 114a for the left eye and the convex lens 114b for the right eye is simply referred to as a "convex lens 114" in this specification, except for the case where they are particularly discriminated. Similarly, each of the cornea 302a of the left eye of the user 300 and the cornea 302b of the right eye of the user 300 is simply referred to as a "cornea 302" except for the case where they are particularly discriminated. Each of the lens holder 152a for the left eye and the lens holder 152b for the right eye is referred to as a "lens holder 152" except for the case where they are particularly discriminated.

Plural infrared light sources 103 are provided on the lens holder 152. To avoid complicated explanation, in FIG. 3, infrared light sources illuminating the cornea 302a of the left eye of the user 300 with infrared light are collectively shown as infrared light sources 103a, and infrared light sources illuminating the cornea 302b of the right eye of the user 300 with infrared light are collectively shown as infrared light sources 103b. Hereinafter, each of the infrared light sources 103a and the infrared light sources 103b are referred to as "infrared light sources 103" except for the case where they are particularly discriminated. In the example shown in FIG. 3, six infrared light sources 103a are provided on the lens holder 152a for the left eye. In the same manner, six infrared light sources 103b are provided on the lens holder 152b for the right eye. As described above, the infrared light sources 103 are not disposed on the convex lens 114 directly, but are disposed on the lens holder 152 holding the convex lens 114. Thereby attachment of the infrared light sources 103 is facilitated. Since the lens holder 152 is typically made of a resin or the like, processing for attaching the infrared light sources 103 to the lens holder 152 is easy in comparison with the case of attaching them to the convex lens 114 made of glass or the like.

As mentioned above, the lens holder 152 is a member that holds the convex lens 114. Accordingly, the infrared light sources 103 provided on the lens holder 152 are configured to be provided around the convex lens 114. Note that although the six infrared light sources 103 illuminating each eye with infrared light are provided here, the number of the infrared light sources 103 is not limited to this. It is enough to provide at least one light source 103 for each eye, and two or more light sources 103 are desirably provided.

Figure 4:
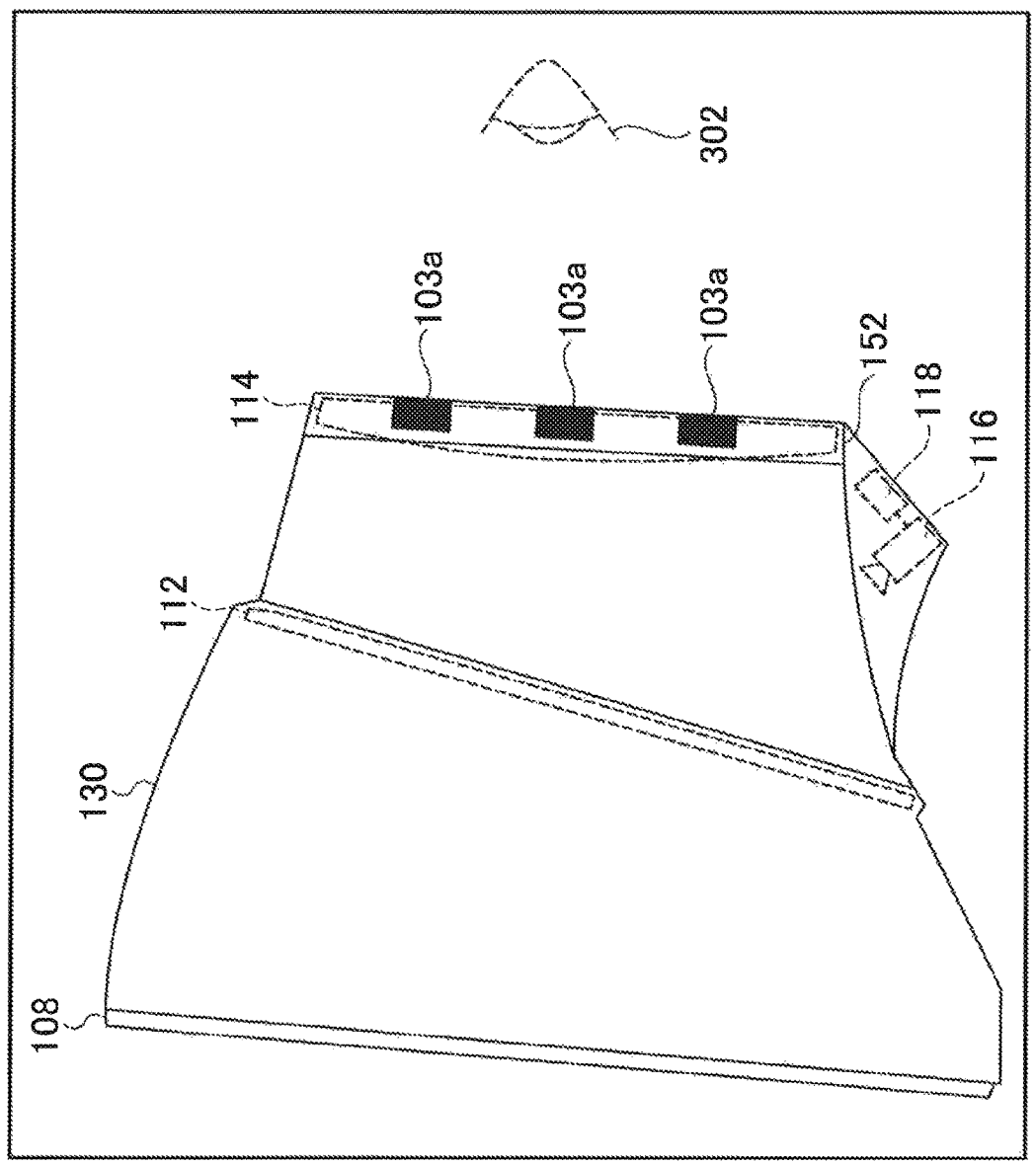
FIG. 4 is a diagram schematically illustrating the optical configuration of the image display system of the head mounted display.

FIG. 4 is a diagram schematically illustrating the optical configuration of the image display system 130 contained in the housing 150 according to the exemplary embodiment, and the diagram in the case where the housing 150 shown in FIG. 3 is seen from the side where the left eye is located. The image display system 130 includes the infrared light sources 103, an image display element 108, a hot mirror 112, the convex lens 114, the camera 116, and a first communication unit 118.

The infrared right sources 103 are light sources capable of emitting light in a wavelength band of near-infrared (from approximately 700 nm to approximately 2500 nm). The near-infrared light is in a wavelength band of invisible light, which the eyes of the user 300 are unable to observe.

The image display element 108 displays an image to be presented to the user 300. The image displayed by the image display element 108 is created by a video creating unit 222 in the eye-gaze detection apparatus 200. Description of the video creating unit 222 will be given later. The image display element 108 may be implemented by using an already-known liquid crystal display (LED), an organic electro luminescence display (organic EL display), or the like.

The hot mirror 112 is disposed between the image display element 108 and the cornea 302 of the user 300 when the user 300 wears the head mounted display 100. The hot mirror 112 has a property of transmitting visible light created by the image display element 108 but reflecting near-infrared light.

The convex lens 114 is disposed on the opposite side of the image display element 108 with respect to the hot mirror 112. In other words, the convex lens 114 is disposed between the hot mirror 112 and the cornea 302 of the user 300 when the user 300 wears the head mounted display 100. That is, the convex lens 114 is disposed on the position facing the cornea 302 of the user 300 when the head mounted display 100 is mounted on the user 300.

The convex lens 114 collects image-display light transmitting the hot mirror 112. Thus, the convex lens 114 functions as an image magnifying unit that magnifies an image created by the image display element 108 and presents the resultant image to the user 300. Note that, although only one convex lens 114 is shown in FIG. 3 for convenience of explanation, the convex lens 114 may be a group of lenses configured by combining various kinds of lenses, or a one-side convex lens in which one side has a curvature, and the other side is a flat surface.

The plural infrared light sources 103 are disposed around the convex lens 114. The infrared light sources 103 emit infrared light toward the cornea 302 of the user 300.

Although not shown in the figure, the image display system 130 of the head mounted display 100 according to the exemplary embodiment is provided with two image display elements 108. Thus, an image to be presented to the right eye of the user 300 and an image to be presented to the left eye of the user 300 may be independently presented. Accordingly, the head mounted display 100 according to the exemplary embodiment may present a parallax image for a right eye to the right eye of the user 300 and a parallax image for a left eye to the left eye of the user 300. Thereby, the head mounted display 100 according to the exemplary embodiment may present stereoscopic vision having a sense of depth to the user 300.

As mentioned above, the hot mirror 112 transmits visible light but reflects the near-infrared light. Thus, the image light emitted by the image display element 108 is transmitted through the hot mirror 112, and reaches the cornea 302 of the user 300. The infrared light emitted from the infrared light sources 103 and reflected on a reflect region inside the convex lens 114 reaches the cornea 302 of the user 300.

The infrared light reaching the cornea 302 of the user 300 is reflected on the cornea 302 of the user 300, and directed to the convex lens 114 again. The infrared light is transmitted through the convex lens 114, but is reflected on the hot mirror 112. The camera 116 includes a filter that shuts out the visible light, and captures the near-infrared light reflected on the hot mirror 112, as an image. That is, the camera 116 is a near-infrared camera capable of capturing, as an image, the near-infrared light emitted from the infrared light sources 103 and reflected on the cornea of the eye of the user 300.

Note that, although not shown in the figure, the image display system 130 of the head mounted display 100 according to the exemplary embodiment includes two cameras 116, that is, a first image capturing unit that captures an image containing the infrared light reflected on the right eye and a second image capturing unit that captures an image containing the infrared light reflected on the left eye. By this configuration, images for detecting gaze directions of the right and left eyes of the user 300 may be obtained.

The first communication unit 118 outputs the image captured by the camera 116 to the eye-gaze detection apparatus 200 that detects a gaze direction of the user 300. Specifically, the first communication unit 118 transmits the image captured by the camera 116 to the eye-gaze detection apparatus 200. Although detailed description will be given of an eye-gaze detection unit 221 functioning as a gaze-direction detecting unit, it is implemented by an eye-gaze detection program executed by the central processing unit (CPU) of the eye-gaze detection apparatus 200. Note that, in the case where the head mounted display 100 has computation resources such as a CPU and a memory, the CPU of the head mounted display 100 may execute the program to realize the gaze-direction detection unit.

Although the detailed description will be given later, the image captured by the camera 116 contains bright spots caused by the near-infrared light reflected on the cornea 302 of the user 300 and an image of the eye including the cornea 302 of the user 300 observed in the wavelength band of the near-infrared light. Although the near-infrared light from the infrared-light sources has a certain level of directivity, diffusion light is also emitted at a certain level. Thus, the image of the eye of the user 300 is captured by the diffusion light.

Although the aforementioned description has been given of the configuration for mainly presenting an image to the left eye of the user 300 in the image display system 130 according to the exemplary embodiment, the configuration for presenting an image to the right eye of the user 300 is the same as the above.

Figure 5:
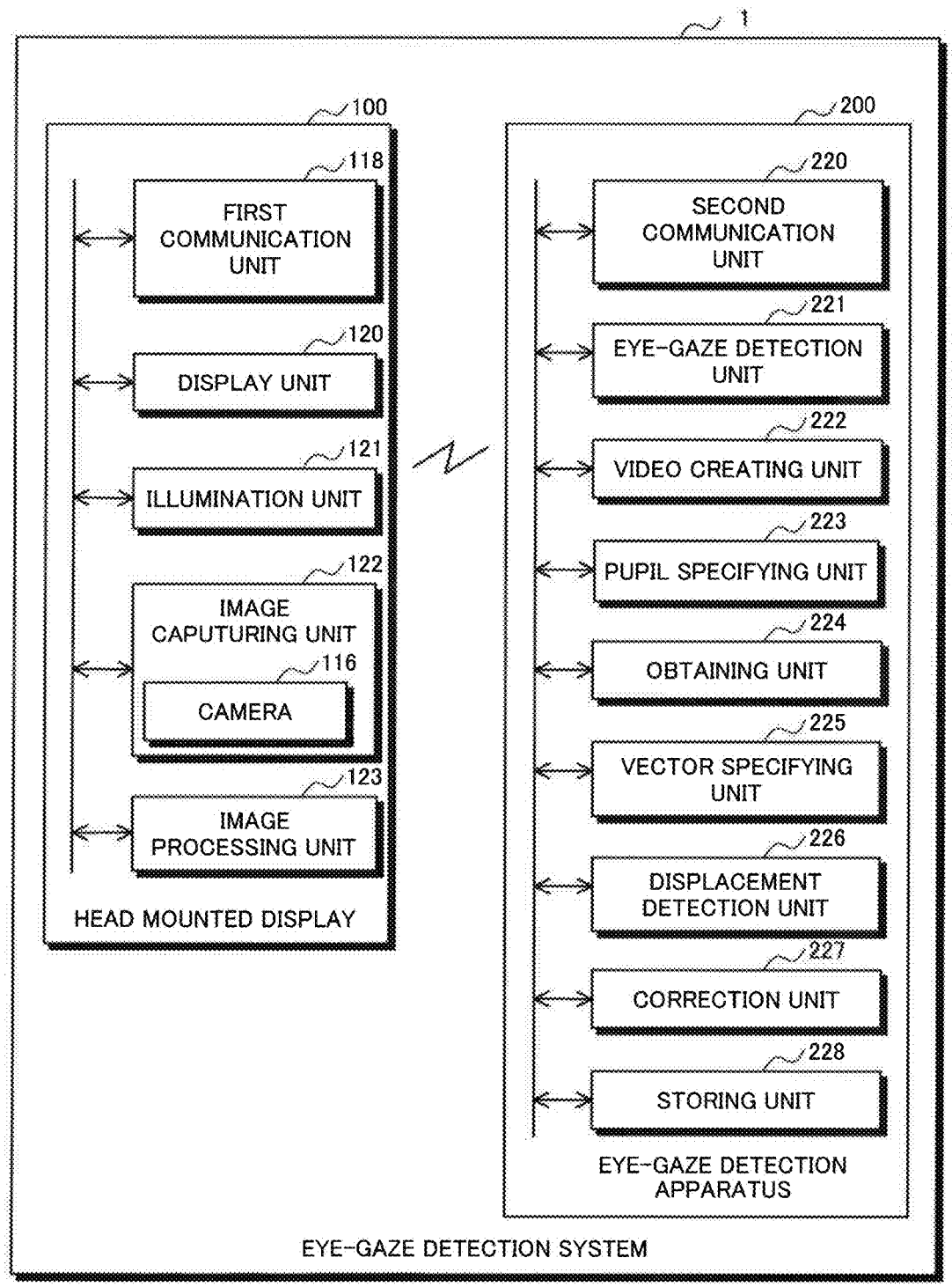
FIG. 5 is a block diagram illustrating the configuration of the eye-gaze detection system.

FIG. 5 is a block diagram illustrating the detailed configuration of the head mounted display 100 and the eye-gaze detection apparatus 200 according to the eye-gaze detection system 1.

As shown in FIG. 5, the head mounted display 100 includes the first communication unit 118, a display unit 120, the illumination unit 121, an image capturing unit 122, and an image processing unit 123.

The first communication unit 118 is a communication interface having a function of executing communication with the eye-gaze detection apparatus 200. As mentioned above, the first communication unit 118 executes communication with a second communication unit 220 through wired or wireless communication. The example of an available communication standard has already given in the above. The first communication unit 118 transmits, to the second communication unit 220, image data (data of the captured image) used for eye-gaze detection, which has been transmitted from the image capturing unit 124 or the image processing unit 123. Further, the first communication unit 118 transmits, to the display unit 120, image data or marker images transmitted from the eye-gaze detection apparatus 200. The image data may be data for displaying a virtual-space image or a game content image as an example. Further, the image data may be a pair of parallax images as a parallax image for a right eye and a parallax image for a left eye in order to display a three-dimensional image.

The display unit 120 has a function of displaying image data transmitted from the first communication unit 118 and created by the video creating unit 222, on the image display element 108. Further, the display unit 120 displays the marker images supplied from the video creating unit 222 at the coordinates designated on the image display element 108.

The illumination unit 121 controls the infrared light sources 103, and illuminates the right eye or the left eye of the user with near-infrared light.

The image capturing unit 122 captures an image containing near-infrared light reflected on each eye using the camera 116. Further, the image capturing unit 122 captures an image containing the user's eye gazing at each marker image displayed on the image display element 108. The image capturing unit 122 transmits the image obtained by image capture to the first communication unit 118 or the image processing unit 123.

The above description has been given of the configuration of the head mounted display 100. Next, detailed description will be given of the eye-gaze detection apparatus 200.

As shown in FIG. 5, the eye-gaze detection apparatus 200 includes the second communication unit 220, the eye-gaze detection unit 221, the video creating unit 222, the pupil specifying unit 223, the obtaining unit 224, the vector specifying unit 225, the displacement detection unit 226, a correction unit 227, and a storing unit 228.

The second communication unit 220 is a communication interface having a function of executing communication with the first communication unit 118 of the head mounted display 100. As mentioned above, the second communication unit 220 executes wired or wireless communication with the first communication unit 118. The second communication unit 220 transmits, to the head mounted display 100, image data to display a virtual-space image containing one or more advertisement transmitted from the video creating unit 222, or marker images used for calibration. In addition, the second communication unit 220 transmits, to the eye-gaze detection unit 221, the pupil specifying unit 223, or the obtaining unit 224, the image containing the eye of the user gazing at each marker image, which has been captured by the image capturing unit 122 and then transmitted from the head mounted display 100, or the captured image in which the eye of the user looking at the image displayed on the basis of the image data supplied from the video creating unit 222 has been captured.

The eye-gaze detection unit 221 receives the image data (captured image) for the eye-gaze detection of the right eye of the user from the second communication unit 220, and detects the gaze direction of the right eye of the user. Similarly, the eye-gaze detection unit 221 receives the image data for the eye-gaze detection of the left eye of the user from the second communication unit 220, and detects the gaze direction of the left eye of the user. More specifically, the eye-gaze detection unit 221 specifies the point at which the user gazes in the image displayed on the image display element 108, by an eye-gaze detection technique to be described later. The eye-gaze detection unit 221 transmits the point at which the user gazes (gaze coordinates on the image display element 108) to the video creating unit 222.

The video creating unit 222 creates image data to be displayed on the display unit 120 of the head mounted display 100, and transmits the created image data to the second communication unit 220. Further, the video creating unit 222 creates marker images for calibration to perform eye-gaze detection, transmits the images together with the display coordinate positions to the second communication unit 220, and then causes them to be transmitted to the head mounted display 100. Furthermore, the video creating unit 222 creates a video on the basis of the gaze point of the user supplied from the eye-gaze detection unit 221 or the correction unit 227, and transmits the data to the second communication unit 220. For example, the video creating unit 222 creates video data so that the gaze position has high resolution, and transmits the data to the second communication unit 220.

The pupil specifying unit 223 receives the captured image in which the user's eye has been captured, from the second communication unit 220, and analyzes the image. The pupil specifying unit 223 specifies the coordinate position of the pupil center in the captured image, and transmits the specified coordinate position to the vector specifying unit 225.

The obtaining unit 224 specifies a plane containing a vector from the center of the camera 116 to the position of the first infrared-light source stored in the storing unit 228 and a vector from the center of the camera 116 to the illuminated position from the first infrared-light source in the captured image, on the basis of these vectors. The center of the corneal curvature of the eye of the user 300 exits anywhere on the plane. Similarly, the obtaining unit 224 specifies the plane containing a vector from the center of the camera 116 to the position of the second infrared-light source stored in the storing unit 228 and a vector from the center of the camera 116 to the illuminated position from the second infrared-light source in the captured image, on the basis of these vectors. The center of the corneal curvature of the eye of the user 300 also exits anywhere on this plane. Then, the vector of the intersection line indicating the intersection line of the specified two planes is specified. The obtaining unit 224 transmits, to the vector specifying unit 225, the information of the vector of the intersection line passing through the center of the corneal curvature, as the information on the center of the corneal curvature of the user 300.

The vector specifying unit 225 specifies the vector V from the center of the corneal curvature of the user's eye to the pupil center in the captured image on the basis of the coordinate position of the pupil center specified by the pupil specifying unit 223 and the vector of the intersection line transmitted from the obtaining unit 224. The vector specifying unit 225 specifies the virtual interconnecting point between the vector of the intersection line obtained by the obtaining unit 224 and the image sensor of the camera 116, that is, the coordinate position on the captured image. Then, the intersecting point between the vector of the intersection line and the image sensor is set as the center of the corneal curvature, and the vector V therefrom to the pupil center is specified. The vector V contains the information of the leading end of the vector (center of the corneal curvature) and the terminal end of the vector (the pupil center). The vector specifying unit 225 transmits the specified vector V to the displacement detection unit 226.

The displacement detection unit 226 compares the position coordinates of the vector V1 specified at the first time t1 by the vector specifying unit 225 and the position coordinates of the vector V2 specified at the second time t2, and determines whether the head mounted display 100 mounted on the user is displaced. The displacement detection unit 226 determines that the mounting state of the head mounted display 100 mounted on the user is displaced in the case where the lengths and the directions of the vector V1 and the vector V2 coincide with each other within a predetermined range (within a range of error) but the position coordinates thereof do not coincide with each other by a predetermined range or more. In the other cases, the displacement detection unit 226 determines that the head mounted display 100 mounted on the user is not displaced.

The correction unit 227 has a function of correcting the gaze position of the user 300 detected by the eye-gaze detection unit 221 on the basis of the displaced amount detected by the displacement detection unit 226. Thereby, even if the head mounted display 100 mounted on the user 300 is displaced, the position at which the user gazes is calculated correctly by correcting the detected gaze position at which the user gazes.

The storing unit 228 is a recording medium in which the various kinds of programs and data needed by the eye-gaze detection apparatus 200 on operation are stored. The storing unit 228 is implemented by a hard disc drive (HDD) or a solid state drive (SSD), for example. The storing unit 228 stores an eye-gaze detection program used for eye-gaze detection by the eye-gaze detection unit 221, a displacement detection program used by the pupil specifying unit 223, the obtaining unit 224, the vector specifying unit 225, and the displacement detection unit 226, information of vectors from the camera 116 to respective infrared light sources, and the like.

The above description has been given of the eye-gaze detection apparatus 200. Next, description will be given of detection of a gaze point of a user.

Figure 6:
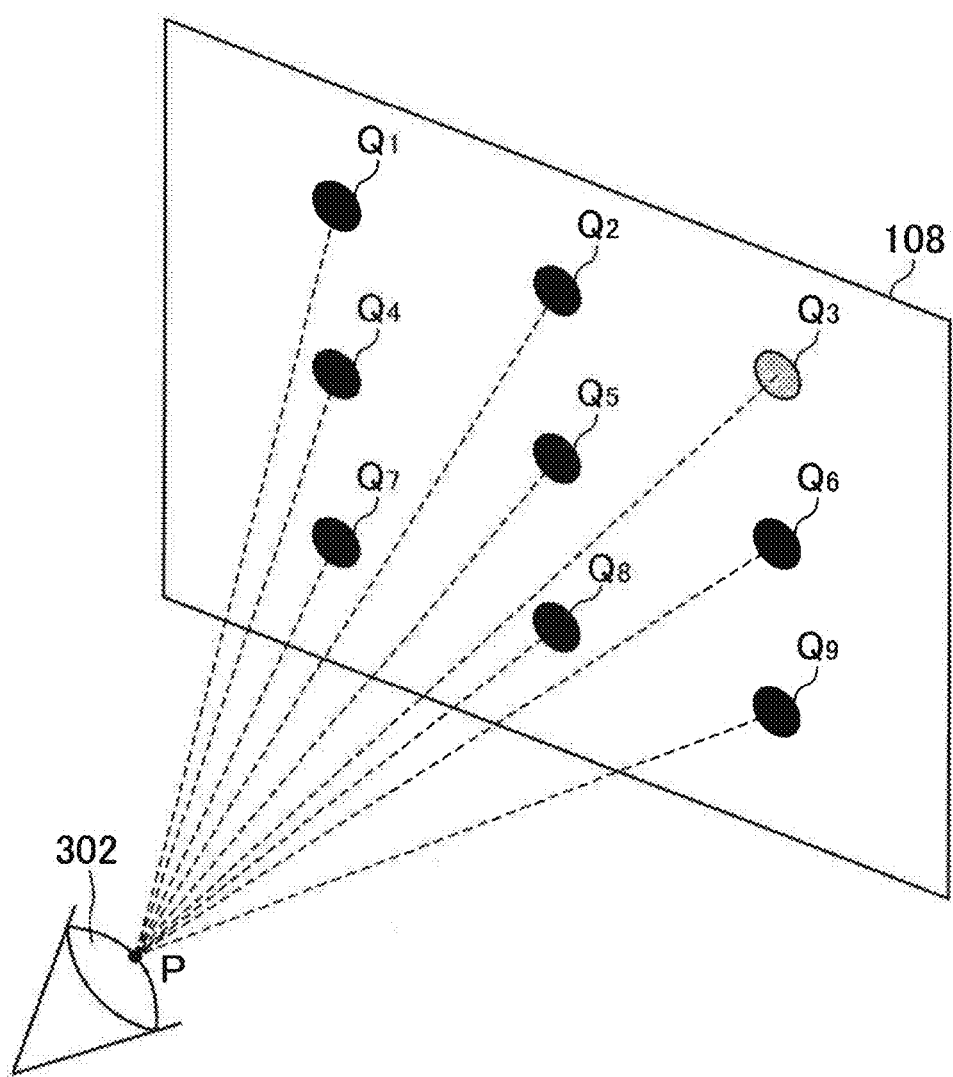
FIG. 6 is a schematic diagram illustrating calibration for detecting a gaze direction.

FIG. 6 is a schematic diagram illustrating calibration for detecting a gaze direction according to the exemplary embodiment. The gaze direction of the user 300 is obtained by analyzing, by the eye-gaze detection unit 221 in the eye-gaze detection apparatus 200, the image captured by the camera 116 and output to the eye-gaze detection apparatus 200 from the first communication unit 118.

The video creating unit 222 creates nine points (marker images) of points Q1 to Q9 as shown in FIG. 6, and causes the marker images to be displayed on the image display element 108 of the head mounted display 100. The eye-gaze detection apparatus 200 instructs the user 300 to gaze the points Q1 to Q9 sequentially. At this time, the user 300 is required to gaze at each of the points only by moving the eye balls without moving the neck as much as possible. The camera 116 captures the image containing the cornea 302 of the user 300 when the user 300 gaze at each of the nine points Q1 to Q9.

Figure 7:
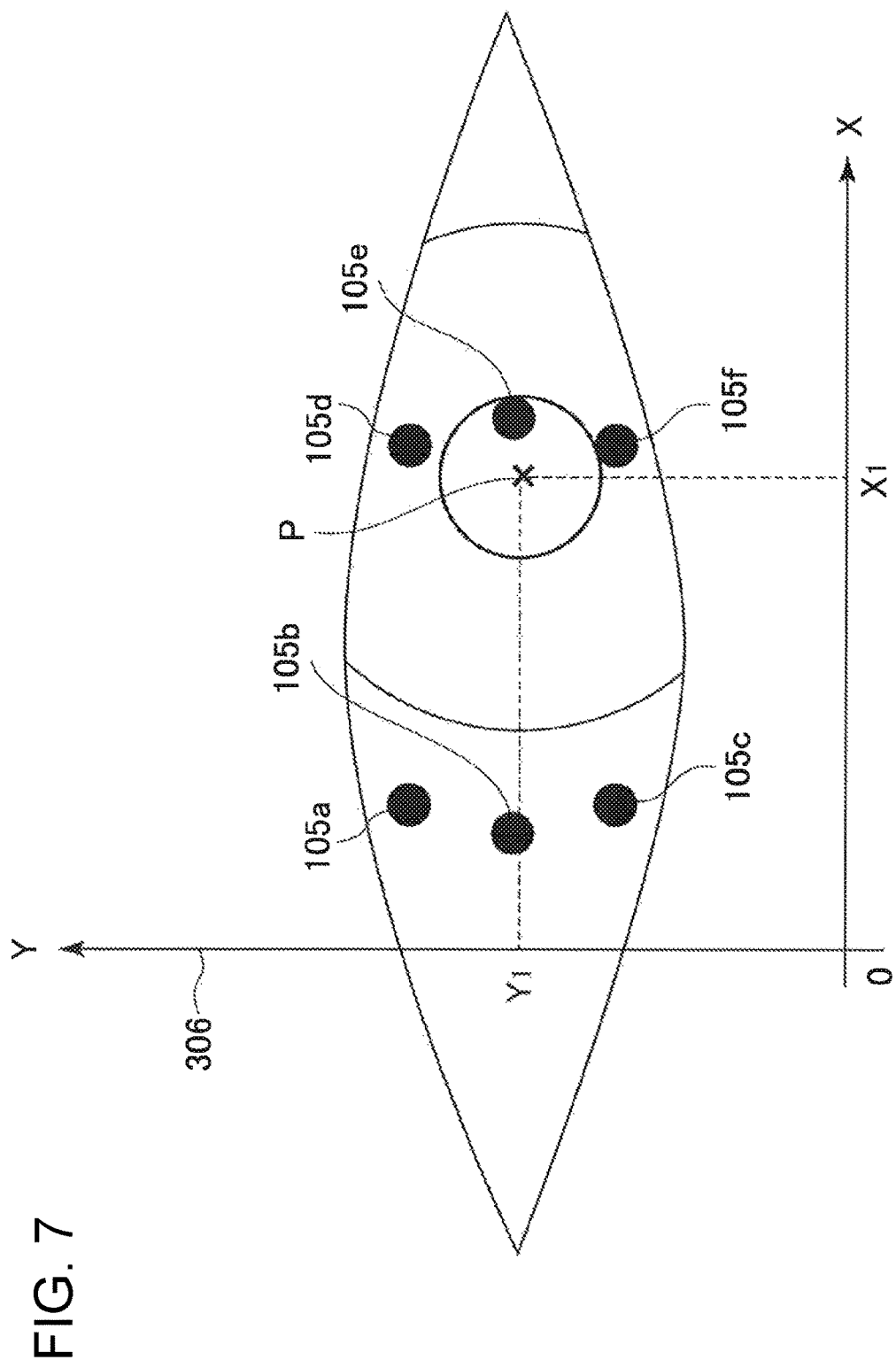
FIG. 7 is a schematic diagram illustrating the position coordinates of the cornea of the user.

FIG. 7 is a schematic diagram illustrating the position coordinates of the cornea 302 of the user 300. The eye-gaze detection unit 221 in the eye-gaze detection apparatus 200 analyzes the image captured by the camera 116, and detects bright spots 105 derived from the infrared-light. When the user 300 gazes at each of the points only by moving the eye ball, the positions of the bright spots 105 are considered not to move in every case where the user gazes at any of the points. Thus, the eye-gaze detection unit 221 sets a two-dimensional coordinate system 306 in the image captured by the camera 116 on the basis of the detected bright spots 105.

Further, the eye-gaze detection unit 221 detects the center P of the cornea 302 of the user 300 by analyzing the image captured by the camera 116. It is achieved by using an already-known image processing such as the Hough transform or edge extraction processing. Thereby, the eye-gaze detection unit 221 obtains the coordinates of the center P of the cornea 302 of the user 300 in the set two-dimensional coordinate system 306.

In FIG. 6, the coordinates of the points Q1 to Q9 in the two-dimensional coordinate system set for the display screen displayed on the image display element 108 are set as $Q_1(x_1, y_1)^T, Q_2(x_2, y_2)^T, \ldots Q_9(x_9, y_9)^T$. Each of the coordinates becomes the number of the image element located on the center of each point, for example. The center P of the cornea 302 of the user 300 when the user 300 gazes at each of the points Q1 to Q9 is set as corresponding points $P_1$ to $P_9$. At this time, the coordinates of the points $P_1$ to $P_9$ in the two-dimensional coordinate system 306 are set as $P_1(X_1, Y_1)^T, P_2(X_2, Y_2)^T, \ldots, P_9(X_9, y_9)^T$. Note that T represents transposition of a vector or a matrix.

Now the matrix M composed of 2×2 is defined as the following equation (1).

$$M = \begin{pmatrix} m_{11} & m_{12} \\ m_{21} & m_{22} \end{pmatrix} \tag{1}$$

At this time, if the matrix M satisfies the following equation (2), the matrix M becomes a matrix projecting the gaze direction of the user 300 to the image surface displayed by the image display element 108.

$$Q_N = MP_N (N=1, \ldots, 9) \tag{2}$$

If the aforementioned equation (2) is specifically expressed, the following equation (3) is obtained.

$$\begin{pmatrix} x_1 & x_2 & \ldots & x_9 \\ y_1 & y_2 & \ldots & y_9 \end{pmatrix} = \begin{pmatrix} m_{11} & m_{12} \\ m_{21} & m_{22} \end{pmatrix} \begin{pmatrix} X_1 & X_2 & \ldots & X_9 \\ Y_1 & Y_2 & \ldots & Y_9 \end{pmatrix} \quad (3)$$

By rearranging the equation (3), the following equation (4) is obtained.

$$\begin{pmatrix} x_1 \\ x_2 \\ \vdots \\ x_9 \\ y_1 \\ y_2 \\ \vdots \\ y_9 \end{pmatrix} = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix} \begin{pmatrix} m_{11} \\ m_{12} \\ m_{21} \\ m_{22} \end{pmatrix} \quad (4)$$

$$y = \begin{pmatrix} x_1 \\ x_2 \\ \vdots \\ x_9 \\ y_1 \\ y_2 \\ \vdots \\ y_9 \end{pmatrix},$$

$$A = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix},$$

$$x = \begin{pmatrix} m_{11} \\ m_{12} \\ m_{21} \\ m_{22} \end{pmatrix}$$

Here, if y, A and x are set as the above matrices, the following equation (5) is obtained.

$$y = Ax \quad (5)$$

In the equation (5), the elements of the vector y are already known because they are coordinates of the points Q1 to Q9 caused to be displayed on the image display element 108 by the eye-gaze detection unit 221. Further, the elements of the matrix A are obtained because they are the coordinates of the peak point P of the cornea 302 of the user 300. Thus, the eye-gaze detection unit 221 obtains the vector y and the matrix A. Note that the vector x that is the vector in which the elements of the conversion matrix M are arranged is unknown. Thus, the problem to estimate the matrix M becomes the problem to calculate the unknown vector x if the vector y and the matrix A have already been known.

The equation (5) becomes an over-determined problem if the number of equations (that is, the number of points Q presented to the user 300 at the calibration by the eye-gaze detection unit 221) is larger than the number of the unknown numbers (that is, four, the number of elements of the vector x). Since the number of the equations are nine in the example shown in the equation (5), it is the over-determined problem.

An error vector between the vector y and the vector Ax is set as a vector e. That is, e=y−Ax. At this time, an optimal vector $x_{opt}$ from the standpoint of minimizing the sum of squares of elements of the vector e is calculated from the following equation (6).

$$x_{opt} = (A^T A)^{-1} A^T y \quad (6)$$

Here, "−1" represents an inverse matrix.

The eye-gaze detection unit 221 uses the elements of the calculated vector $X_{opt}$ and thereby composes the matrix M of the equation (1). Accordingly, the eye-gaze detection unit 221 estimates the point at which the right eye of the user 300 gazes on the video image displayed on the image display element 108 according to the equation (2) using the coordinates of the peak point P of the cornea 302 of the user 300 and the matrix M. Here, the eye-gaze detection unit 221 further receives, from the head mounted display 100, information of distance between the user's eye and the image display element 108, and corrects the estimated coordinate value at which the user gazes, according to the information of the distance. Note that the displacement from the estimation of the gaze position according to the distance between the user's eye and the image display element 108 may be regarded to be within the range of error, and be ignored. Thereby, the eye-gaze detection unit 221 calculates a gaze vector for the right eye connecting the gaze point of the right eye on the image display element 108 and the peak point of the cornea of the right eye of the user. Similarly, the eye-gaze detection unit 221 calculates a gaze vector for the left eye connecting the gaze point of the left eye on the image display element 108 and the peak point of the cornea of the left eye of the user. Note that, by using only a gaze vector for one eye, the gaze point of the user on the two-dimensional plane may be specified, and by obtaining the gaze vectors for both eyes, information of the gaze point of the user in the depth direction may be specified. The eye-gaze detection apparatus 200 may specify the gaze point of the user as mentioned above. Note that the method for specifying the gaze point shown here is an example, and the gaze point of the user may be specified by using a technique other than that shown in the exemplary embodiment.

Next, description will be given of the detection of displacement by the displacement detection unit 226.

Figure 8:
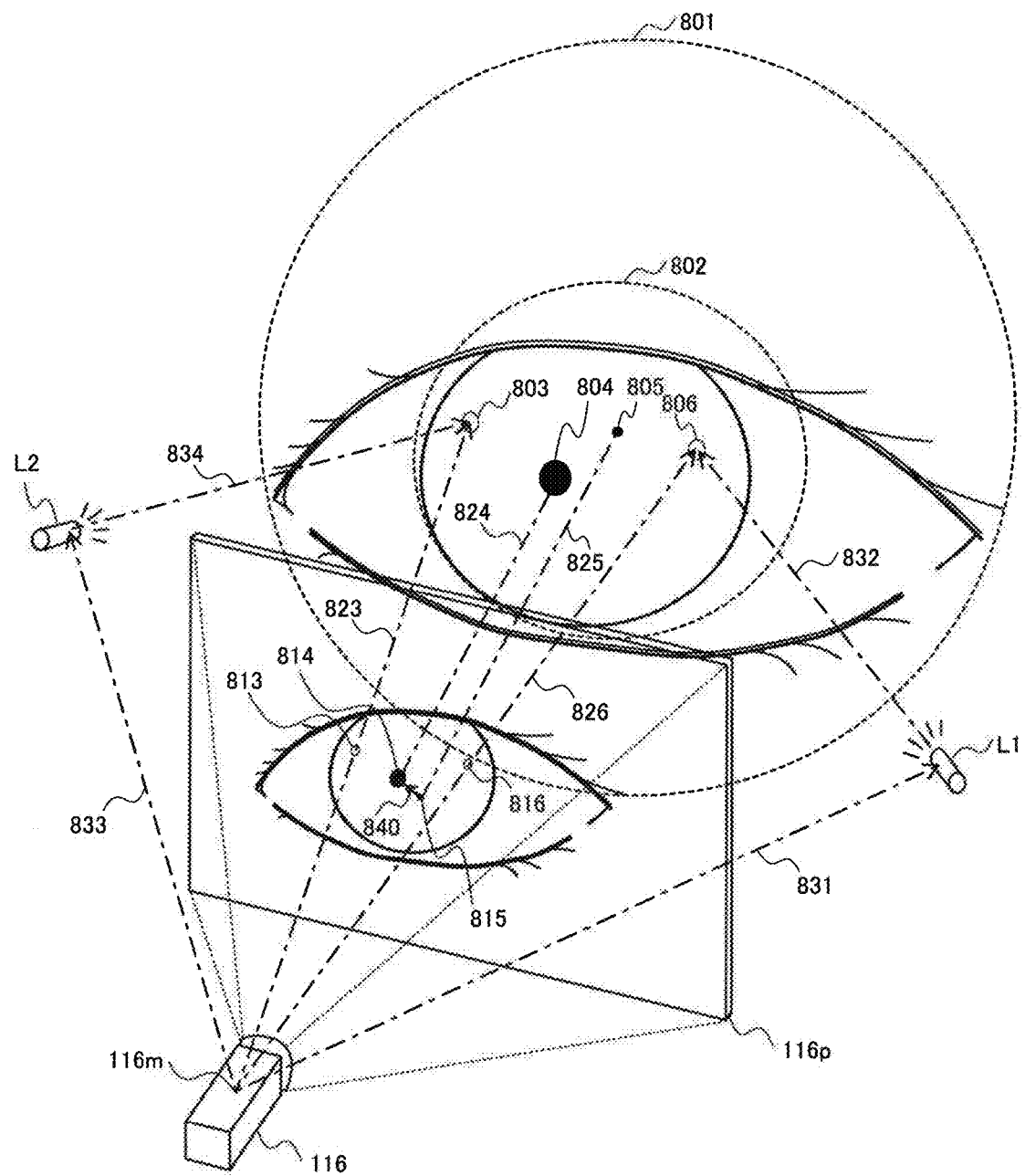
FIG. 8 is a diagram schematically illustrating the summary of displacement detection.

FIG. 8 is a schematic diagram illustrating an image capturing system according to this invention, and given for conceptually illustrating a vector 840 which is used for detection of the displacement in wearing.

Figure 10:
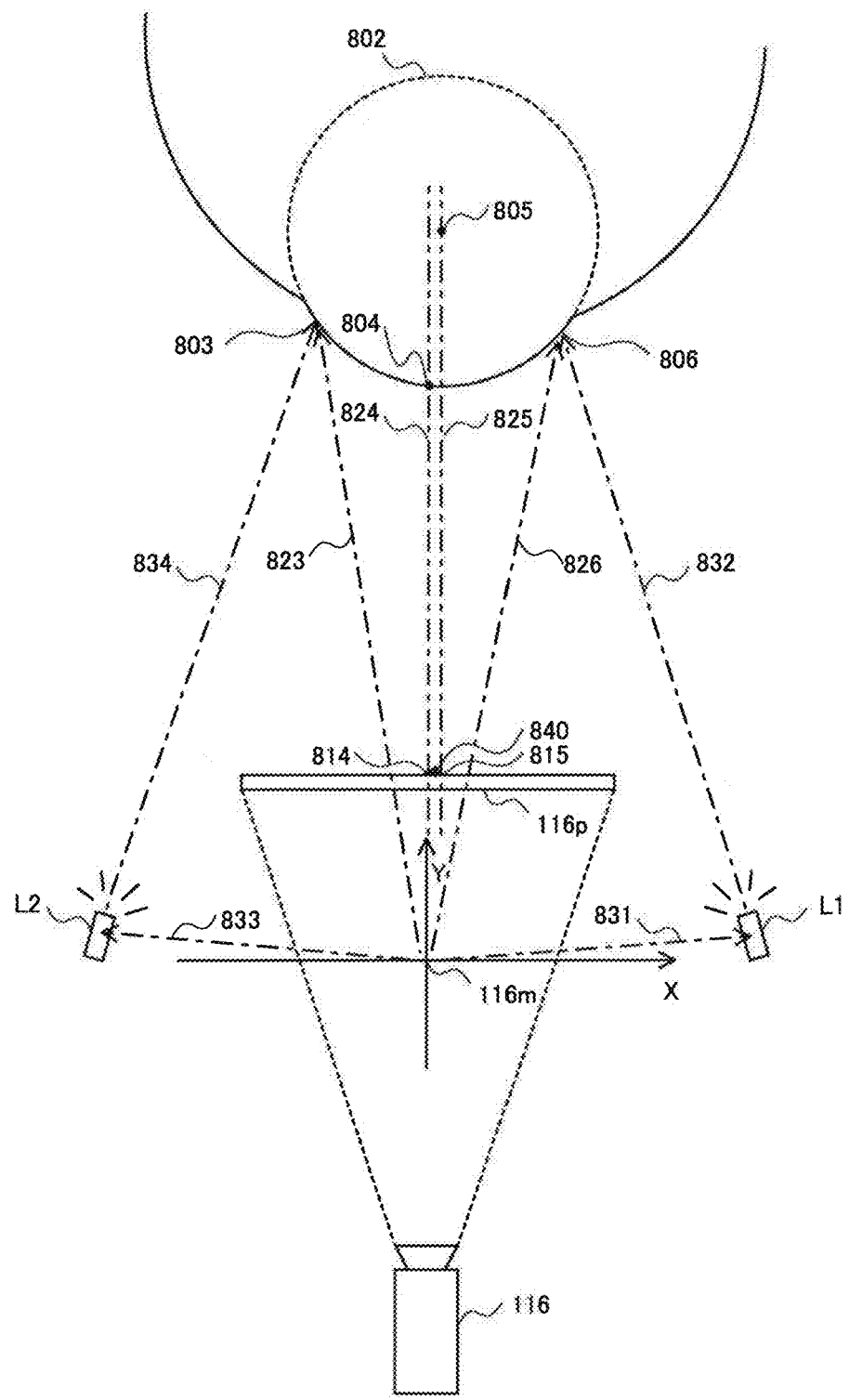
FIG. 10 is a plan view schematically illustrating the summary of displacement detection.

FIG. 8 is a conceptual diagram illustrating the scene when the camera 116 captures the user's eye. FIG. 10 is a plan view in the case where FIG. 8 is seen as a plane. Here, an example is shown in which the eye (right eye) of the user illuminated with invisible light (near-infrared light) from the infrared light sources L1 and L2 is captured by the camera 116. The infrared light sources L1 and L2 are any of the infrared light sources 103a. The convex lens 114 and the hot mirror 112 are originally interposed between the camera 116 and the eye. Further, as shown in FIG. 3, the camera 116 captures the image once reflected by the hot mirror 112. However, to make the description simple, the state with no reflection is shown here. FIG. 8 shows the camera 116 capturing the eye of the user 300 and picture of mapping to an image sensor 116*p* inside the camera 116. The camera 116 is a compact camera, and an optical axis of the captured image is to focus light toward the center 116*m* of the camera 116. Note that, in FIG. 8, the other infrared-light sources are omitted in order to easily see the drawing.

Although the image sensor 116*p* is shown as if it is located on the outside of the camera 116 in FIG. 8 and FIG. 10, it is only for easily understanding the drawings and the explanation. In fact, the image sensor 116*p* exists inside the camera 116. Similarly, the center 116*m* of the camera 116 in FIG. 10 also exists inside the camera 116. Further, the coordinate system shown as X-Y axes in FIG. 10 is virtually set.

Figure 9:
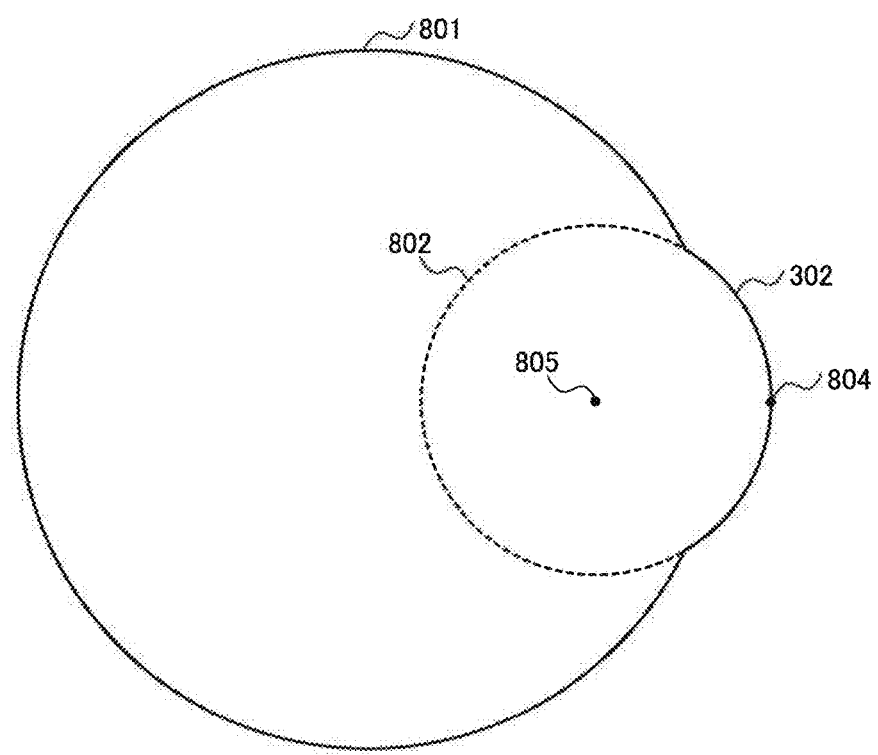
FIG. 9 is an image of an eye ball.

The displacement detection unit 226 detects the displacement of the mounting state of the head mounted display 100 using the vector 840 shown in FIG. 8. The vector 840 is mapping of the vector from the center of the corneal curvature of the user 300 to the pupil center on the image sensor 116*p*. As shown in FIG. 9, there is a publicly-known fact that the eye ball of the user 300 is not a sphere and has a configuration where the cornea protrudes. As shown in FIG. 9, the cornea 302 exists on the end part of the eye ball 801, and functions as a convex lens, and the center thereof is the pupil center 804. If the cornea 302 is assumed to form a sphere, the sphere becomes a corneal sphere 802. The center of the corneal sphere 802 is the center 805 of the corneal curvature of the cornea 302. The aforementioned vector 840 is mapping of a vector from the center 805 of the corneal curvature to the pupil center 804 on the image sensor 116*p* (note that only mapping of the pupil center 804 is captured on the image sensor 116*p* in reality).

As shown in FIG. 8, with the near-infrared light emitted from the infrared light source L1, the illuminated position 806 on the eye of the user 300 is illuminated as indicated by the optical axis of the vector 832. The illumination light is reflected on the cornea 302 of the user 300, passes through the optical axis of the vector having the opposite direction of the vector 826 in FIG. 8, and goes to the center 116*m* of the camera 116. The illumination light projected to the eye of the user 300 forms an image, as mapping 816, on the image sensor 116*p*.

Similarly, with the near-infrared light emitted from the infrared light source L2, the illuminated position 803 on the eye of the user 300 is illuminated as indicated by the optical axis of the vector 834. The illumination light is reflected on the cornea 302 of the user 300, passes through the optical axis of the vector having the opposite direction of the vector 823 in FIG. 8, and goes to the center 116*m* of the camera 116. The illumination light projected to the eye of the user 300 forms an image, as mapping 813, on the image sensor 116*p*.

By the diffusion light from the infrared light sources L1 and L2, the pupil center 804 of the user 300 also forms an image as pupil mapping 814 on the image sensor 116*p*.

In FIG. 8, the vector 831 is the vector going to the infrared light source L1 from the center 116*m* of the camera 116, and the vector 833 is the vector going to the infrared light source L2 from the center 116*m* of the camera 116.

In FIG. 8, the vector 831, the vector 832, and the vector 826 form one plane (hereinafter referred to as the first plane), and the first plane passes through the center 805 of the corneal curvature of the user. The vector 831 is the vector from the center 116*m* of the camera 116 to the infrared light source L1 as mentioned above, and the already-known vector (measurement value). The information on the vector 831 has been stored in the storing unit 228 in advance. The vector 826 is the vector from the center 116*m* of the camera 116 to the illuminated position 806, and located from the center 116*m* of the camera 116 to extension of the mapping 816 on the image sensor 116*p*, as shown in FIG. 8 and FIG. 10. The relative positional relationship between the center 116*m* of the camera 116 and the image sensor 116*p* is an already-known value (a predetermined value), and has been stored in the storing unit 228. Thus, the vector 826 may be calculated by calculating the vector from the center 116*m* of the camera 116 to the mapping 816 on the image sensor 116*p*. Accordingly, the first plane may be defined by the vector 826 and the vector 831 because the vector 831 is the already-known value and the vector 826 may be obtained by calculation.

Similarly, the vector 833, the vector 834, and the vector 823 form one plane (hereinafter referred to as the second plane), and the second plane passes through the center 805 of the corneal curvature of the user. The vector 833 is the vector from the center 116*m* of the camera 116 to the infrared light source L2 as mentioned above, and the already-known vector (measurement value). The information on the vector 833 has been stored in the storing unit 228 in advance. The vector 823 is the vector from the center 116*m* of the camera 116 to the illuminated position 803, and located from the center 116*m* of the camera 116 to extension of the mapping 813 on the image sensor 116*p*, as shown in FIG. 8 and FIG. 10. The relative positional relationship between the center 116*m* of the camera 116 and the image sensor 116*p* is an already-known value (a predetermined value), and is stored in the storing unit 228. Thus, the vector 823 is calculated by calculating the vector from the center 116*m* of the camera 116 to the mapping 813 on the image sensor 116*p*. Accordingly, the second plane can be defined by the vector 823 and the vector 833 because the vector 833 is the already-known value and the vector 823 can be obtained by calculation.

Since these two planes pass through the center 805 of the corneal curvature of the user 300, the intersection line formed by the first plane and the second plane also passes through the center 805 of the corneal curvature of the user 300. Thus, if the intersection line between the first plane and the second plane is obtained, a virtual mapping 815 of the center 805 of the corneal curvature on the image sensor 116*p* is calculated as an intersection point between the intersection line 825 and the image sensor 116*p*. Then, if the coordinates of the mapping 815 on the image sensor 116*p* are calculated, the vector 840 is calculated. As described above, the eye-gaze detection apparatus 200 (the pupil specifying unit 223, the obtaining unit 224, the vector specifying unit 225) calculates the vector 840. Note that, in the case where the first plane and the second plane are parallel to each other, the vector 840 is not calculated. Thus, in this case, the eye-gaze detection apparatus 200 changes the light source used to calculate the plane to any other infrared light source 103.

Figure 11:
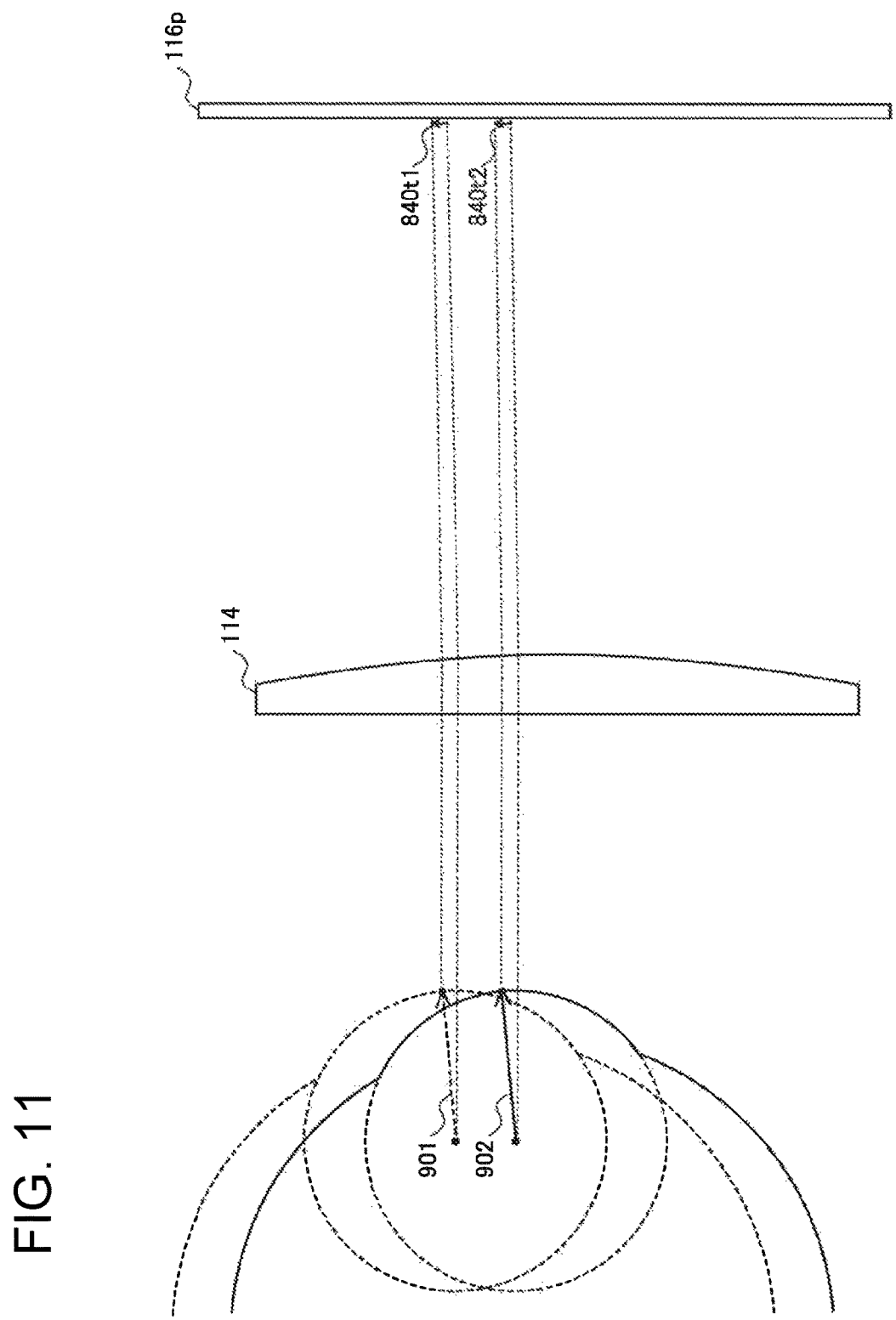
FIG. 11 is a diagram illustrating an example of a relationship between the displacement of the head mounted display and mapping to the image sensor.

FIG. 11 is a side view illustrating an example of how the displacement appears on the image sensor. FIG. 11 shows the case in which the user's eye is displaced from the state shown with dotted lines to the state shown with solid lines. The time point of the state shown with the dotted lines is set as t1, and the time point of the state shown with the solid lines is set as t2. The example of FIG. 11 shows a case where the mounting state of the head mounted display 100 is displaced in the upper direction with respect to the user 300.

It is assumed that the vector 901 from the center of the corneal curvature to the pupil center at the time point t1 is detected as the vector 840*t*1 on the image sensor 116*p* of the camera 116 through the convex lens 114 and the hot mirror 112 (although it is not shown in the figure). Similarly, it is assumed that the vector 902 from the center of the corneal curvature to the pupil center at the time point t2 is detected as the vector 840t2 on the image sensor 116p of the camera 116 through the convex lens 114 and the hot mirror 112 (although it is not shown in the figure). The displacement detection unit 226 compares the vector 840t1 and the vector 840t2 with each other, and detects that the mounting state of the head mounted display 100 is displaced in the case where the length and the direction of these vectors coincide with each other but the coordinate positions are different.

Hereinafter, specific description will be given of the calculation of the vector 840.

A coordinate set to define the aforementioned first surface is set as Π. The coordinate set Π is defined by the equation (7) to be described below.

$$\hat{n}_{\Pi_1} = \frac{\overrightarrow{CG_{i1}} \times \overrightarrow{CL_1}}{\|\overrightarrow{CG_{i1}} \times \overrightarrow{CL_1}\|} = \begin{bmatrix} a_1 \\ b_1 \\ c_1 \end{bmatrix} \quad (7)$$

In the aforementioned equation (7), the vector $CG_{i1}$ is a vector from the center 116m of the camera 116 to the illuminated position, that is, the vector 826 in FIG. 8 and FIG. 10. The vector $CL_1$ is the vector from the center 116m of the camera 116 to the infrared light source L1, that is, the vector 831 in FIG. 8 and FIG. 10. The last element to define the first plane is calculated from the equation (8) to be described below, by setting the center 116m of the camera 116 as a tentative original point (0, 0, 0).

$$\Pi_{1d} = d_1 = -(a_1 xo + b_1 yo + c_1 zo) = -(a_1 \cdot 0 + b_1 \cdot 0 + c_1 \cdot 0) = 0 \quad (8)$$

The plane is defined from the tilts of three axes of the X axis, the Y axis, and the Z axis, and distance from the original point. Since the first plane passes through the original point, distance from the original point is defined as zero. Thus, the first plane Π1 is defined by the following equation (9).

$$\Pi_1 = \begin{bmatrix} a_1 \\ b_1 \\ c_1 \end{bmatrix} = \begin{bmatrix} \hat{n}_{\Pi_1} \\ 0 \end{bmatrix} \quad (9)$$

Similarly, the second plane $\Pi_2$ is defined by the following equation (10).

$$\Pi_2 = \begin{bmatrix} a_2 \\ b_2 \\ c_2 \end{bmatrix} = \begin{bmatrix} \hat{n}_{\Pi_2} \\ 0 \end{bmatrix} \quad (10)$$

From the above equation (9) and equation (10), the intersection line $l_{12}$ (intersection line 825) between the first plane and the second plane is defined by the following equation (11).

$$l_{12} = \frac{\hat{n}_{\Pi_1} \times \hat{n}_{\Pi_2}}{\|\hat{n}_{\Pi_1} \times \hat{n}_{\Pi_2}\|} = t \begin{bmatrix} l_{x12} \\ l_{y12} \\ l_{z12} \end{bmatrix} \quad (11)$$

The mapping 815 of the center 805 of the corneal curvature is calculated as an intersection point between the intersection line 825 shown by the equation (11) and the image sensor 116p. Thus, the vector 840 is identified as the vector from the intersection point to the pupil mapping 814.

<Operation>

Figure 12:
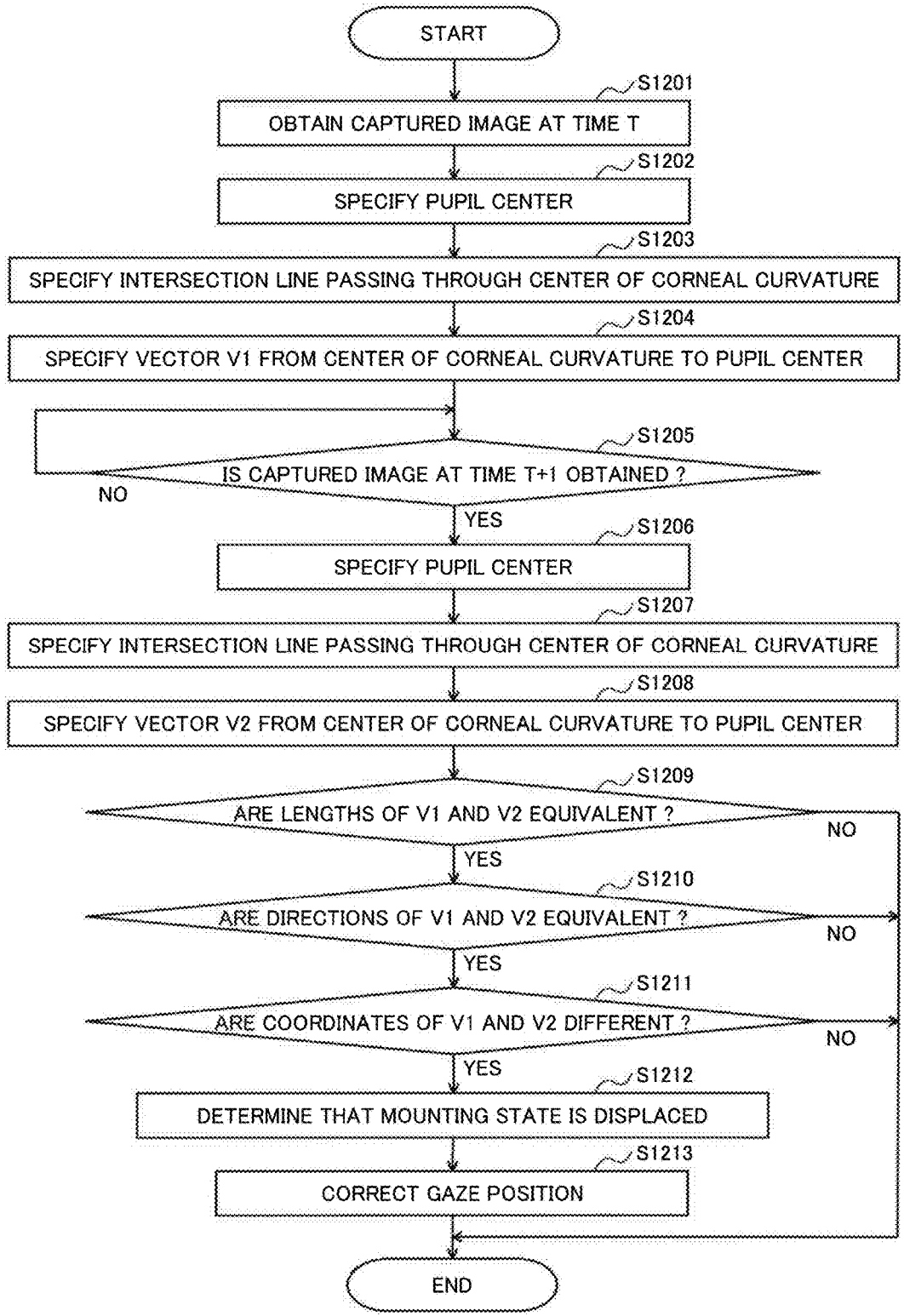
FIG. 12 is a flowchart describing the operation of the eye-gaze detection system.
Figure 13:
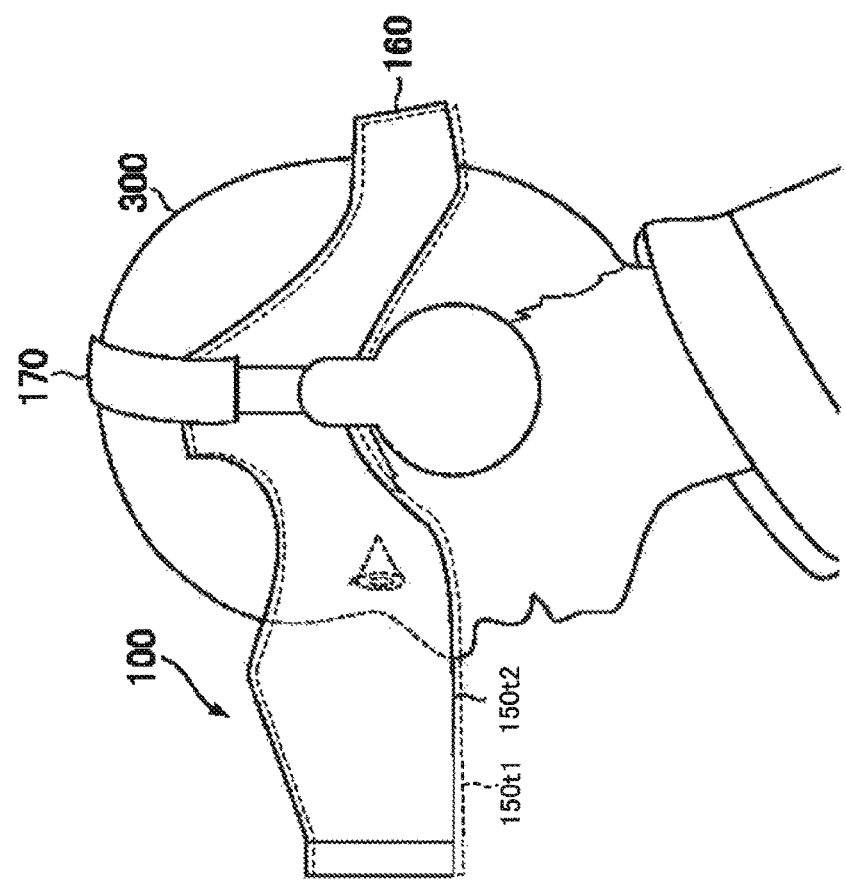
FIG. 13 is a diagram illustrating the situation in which the head mounted display has been displaced.

Hereinafter, description will be given of an operation of the eye-gaze detection apparatus 200 with the flowchart of FIG. 12. FIG. 12 is a flowchart describing the processing of detecting displacement of a mounting state of the head mounted display 100 mounted on the head of the user.

(Step S1201)

At the step S1201, the eye-gaze detection apparatus 200 obtains the captured image at the time t from the head mounted display 100. Upon receiving the captured image at the time t, the second communication unit 220 causes the storing unit 228 to store the captured image, and transmits the captured image to the eye-gaze detection unit 221, the pupil specifying unit 223, and the obtaining unit 224. The eye-gaze detection unit 221 specifies the point at which the user 300 gazes using the transmitted captured image. Then, the processing of the eye-gaze detection apparatus 200 moves onto the step S1202.

(Step 1202)

At the step 1202, the pupil specifying unit 223, to which the captured image has been transmitted, performs image analysis on the captured image, and specifies the coordinates of the pupil center of the user's eye in the captured image. The pupil specifying unit 223 transmits the specified coordinates of the pupil center to the vector specifying unit 225, and the processing moves onto the step 1203.

(Step S1203)

At the step S1203, the obtaining unit 224, to which the captured image has been transmitted, specifies the intersection line passing through the center of the corneal curvature of the user 300 using the aforementioned technique. The obtaining unit 224 transmits the specified intersection line to the vector specifying unit 225, and the processing moves onto the step S1204.

(Step S1204)

At the step S1204, the vector specifying unit 225, to which the pupil center and the intersection line passing through the center of the corneal curvature have been transmitted, firstly specifies the coordinates of the intersection point where the intersection line passing through the center of the corneal curvature intersects with the image sensor of the camera 116. Then, the vector specifying unit 225 calculates the vector V1 from the specified intersection point to the pupil center that has been transmitted. The vector specifying unit 225 transmits the specified vector V1 to the displacement detection unit 226, and the processing moves onto the step S1205.

(Step S1205)

At the step S1205, the second communication unit 220 determines whether a new captured image in which the eye of the user has been captured is obtained or not. The second communication unit 220 waits until a new captured image at time t+1 is obtained (NO). In the case where the new captured image at the time t+1 is obtained (YES), the processing moves onto the step S1206.

(Step S1206)

At the step S1206, the pupil specifying unit 223, to which the new captured image has been transmitted, performs image analysis on the new captured image, and specifies the coordinates of the pupil center of the user's eye in the captured image. The pupil specifying unit 223 transmits the specified coordinates of the pupil center to the vector specifying unit 225, and the processing moves onto the step S1207.

(Step S1207)

At the step S1207, the obtaining unit 224, to which the new captured image has been transmitted, specifies the intersection line passing through the center of the corneal curvature of the user 300 using the aforementioned technique. The obtaining unit 224 transmits the specified intersection line to the vector specifying unit 225, and the processing moves onto the step S1208.

(Step S1208)

At the step S1208, the vector specifying unit 225, to which the pupil center and the intersection line passing through the center of the corneal curvature have been transmitted, firstly specifies the coordinates of the intersection point where the intersection line passing through the center of the corneal curvature intersects with the image sensor of the camera 116. Then, the vector specifying unit 225 calculates the vector V2 from the specified intersection point to the pupil center that has been transmitted. The vector specifying unit 225 transmits the specified vector V2 to the displacement detection unit 226, and the processing moves onto the step S1209.

(Step S1209)

From the step S1209 to the step S1210, the displacement detection unit 226 determines whether the head mounted display 100 mounted on the user 300 is displaced or not. At the step S1209, the displacement detection unit 226 determines whether the length of the vector V1 specified at the step S1204 and the length of the vector V2 specified at the step S1208 are equivalent (within the range of error) or not. In the case where the lengths of the vector V1 and the vector V2 are equivalent (YES), the processing moves onto the step S1210. In the case where they are not equivalent (NO), the processing ends.

(Step S1210)

At the step S1210, the displacement detection unit 226 determines whether the direction of the vector V1 and the direction of the vector V2 are equivalent to each other (within the range of error). In the case where the direction of the vector V1 and the direction of the vector V2 are equivalent to each other (YES), the processing moves onto the step S1211. In the case where they are not equivalent to each other (NO), the processing ends.

(Step S1211)

At the step S1211, the displacement detection unit 226 determines whether the coordinate positions of the vector V1 and the vector V2 are different or not. The displacement detection unit 226 may determine whether the coordinate positions are different on the basis of the determination whether the distance between the vector V1 and the vector V2 is not less than a predetermined value, or whether the coordinate positions of the leading ends (or terminal ends) of the vector V1 and the vector V2 are different. In the case where the coordinate position of the vector V1 and the coordinate position of the vector V2 are different (YES), the processing moves onto the step S1212. In the case where they are not different, that is, the coordinate positions of the vector V1 and the vector V2 are equivalent (within the range of error) (NO), the processing ends.

(Step S1212)

At the step S1212, the displacement detection unit 226 determines that the head mounted display 100 mounted on the user 300 is displaced from the initial state (the mounting state at the time of the calibration) as a result of the determination at steps S1209 to S1211. The displacement detection unit 226 transmits the displacement amount between the vector V1 and the vector V2 to the correction unit 227, and the processing moves onto the step S1213. Here, the displacement amount is the vector from the vector V1 to the vector V2, and is indicated as a vector from the start point (or end point) of the vector V1 to the start point (or end point) of the vector V2.

(Step S1213)

At the step S1213, the correction unit 227 corrects the gaze position detected by the eye-gaze detection unit 221 on the basis of the displacement amount that has been transmitted from the displacement detection unit 226. Specifically, the correction unit 227 outputs, as the gaze position, the coordinate position obtained by adding a vector opposite to the vector indicated as the displacement amount to the coordinates of the gaze position detected by the eye-gaze detection unit 221.

The gaze position supplied by the correction unit 227 is used for, for example, video creation by the video creating unit 222. Specifically, the video creating unit 222 creates an image in which a predetermined range containing the specified gaze position as the center is set to have high resolution, and transmits the image to the head mounted display 100 through the second communication unit 220. In addition, the gaze position is usable for an input position when an application such as a game is executed in the eye-gaze detection system 1, or a marketing tool by specifying a focused position in an image, for example. In the case where the displacement detection unit 226 determines that the head mounted display 100 mounted on the user 300 is not displaced, the eye-gaze detection apparatus 200 does not execute any processing.

The eye-gaze detection apparatus 200 successively performs the processing shown in FIG. 12 while the eye-gaze detection system 1 works.

<Conclusion>

As mentioned above, the eye-gaze detection system 1 detects displacement of the mounting state of the head mounted display 100 mounted on the user 300 on the basis of the vector 840 from the virtual mapping 815 of the center 805 of the corneal curvature of the user 300 on the image sensor 116p of the camera 116 to the pupil mapping 814 of the pupil center 804 on the image sensor 116p in the captured image. The eyes of the user 300 are to keep the same condition at the instance when the head mounted display 100 is displaced. Accordingly, the vector 840 in the captured image just before the displacement and the vector 840 in the captured image at the instance when it is displaced are to have the same length and the same direction. By comparing the length, direction, and the coordinates of the vector 840 at different time, the displacement detection unit 226 detects the displacement of the mounting state of the head mounted display 100 with respect to the user 300. To detect the displacement, complex calculation such as calculation for coordinates of the center 805 of the corneal curvature on the three-dimensional space and coordinates of the center of the eye ball 801 on the three-dimensional space is unnecessary. Thus, the displacement of the mounting state of the head mounted display 100 with respect to the user 300 is detectable with less amount of calculation. In addition, there is an advantageous effect that the detection may be performed without a new sensor such as a touch sensor in the head mounted display 100.

Exemplary Embodiment 2

In the above exemplary embodiment 1, description has been given of the detection and correction of displacement due to the eye-gaze detection apparatus 200. However, the detection and the correction of the displacement according to the aforementioned exemplary embodiment 1 may be applicable to specific lenses. In the exemplary embodiment 2, description will be given of the method of detecting and correcting the displacement of the head mounted display that has been mounted, applicable for lenses of any shape.

Example 1

First, in the example 1, a method in which calibration is performed for a user 30 is described. In the example 1, nine marker images are displayed similarly to the case shown in the above exemplary embodiment 1, each eye of the user 30 gazing at each marker image is captured, the coordinate value of the pupil center at the time on the image capturing system is specified, and calibration data are obtained by associating the value with the coordinate value of each marker image on the image capturing system.

The coordinate of the pupil center of the user is given as $X$ $(x_1, x_2)$ on the image capturing system, and the corresponding coordinate of the mapping of the image display element 108 is given as $Y$ $(y_1, y_2)$. Here, consideration will be given for a mapping function $f_1$ which is expressed as $f_1(x)=y_1$, and a mapping function $f_2$ which is expressed as $f_2(x)=y_2$. Note that each of the functions $f_1$ and $f_2$ is a quadratic polynominal.

As the above quadratic polynominal, a radial basis function using a square kernel is established. By this function, the mapping coordinate value of the pupil center of the user on the coordinate system of the image display element is estimated on the basis of the coordinate value of the pupil center of the user's eye, which has been captured, on the imaging system.

A data group regarding the coordinate of the pupil center obtained by capturing the user's eye is defined as Xn ($0<n\leq N$), and the square kernel $\phi$ ($X, X_n$) is defined as below. Note that, in this example, N is set at 9. However N is not limited to 9.

$$\varphi(X, X_n) = \|X - X_n\|^2$$

Thus, $f_1(X)$ and $f_2(X)$ are defined as below.

$$f_1(X) = \Sigma_{n=1}^{N} a_{1_n} \varphi(X, X_n)$$

$$f_2(X) = \Sigma_{n=1}^{N} a_{2_n} \varphi(X, X_n)$$

Here, unknown coefficients a1 and a2 in the above equations are defined as below.

$$a_1 = [a_{1_1}, a_{1_2}, \ldots, a_{1_N}]^T$$

$$a_2 = [a_{2_1}, a_{2_2}, \ldots, a_{2_N}]^T$$

To calculate these unknown coefficients, the least-square method is used. Specifically, the mathematical expressions shown below are solved.

$$Aa_1 = [y_{1_1}, y_{1_2}, \ldots, y_{1_N}]^T$$

$$Aa_2 = [y_{2_1}, y_{2_2}, \ldots, y_{2_N}]^T$$

Here, A is a square matrix of N×N.

A data group regarding the coordinates of the pupil center of the user on the display system of the image display element is given as $Y_n$ ($0<n\leq N$), while the data group regarding the coordinates of the pupil center obtained by capturing the user's eye is given as $X_n$ ($0<n\leq N$), as described above. The $X_n$ and $Y_n$ are obtained by measurement, and thus they are known values. The data are obtained by performing the calibration shown in the aforementioned exemplary embodiment. That is, the user gazes at the marker image displayed at the specific coordinate position of the image display element 108, the user's eye gazing at the marker image is captured, and thereby a correspondence relationship between the coordinate of the pupil center of the user in the captured image and the specific coordinate position of the image display element 108 is obtainable.

In this situation, the square kernel is defined as below.

$$\varphi(X_i, X_j) = \|X_i - X_j\|^2,$$

wherein $i \in n$, and $j \in n$.

Accordingly, the matrix A may be expressed as the following equation.

$$A = \begin{bmatrix} \varphi(X_1, X_1) & \cdots & \varphi(X_1, X_N) \\ \vdots & \ddots & \vdots \\ \varphi(X_N, X_1) & \cdots & \varphi(X_N, X_N) \end{bmatrix}$$

The matrix A is decomposed, and the pseudo inverse matrix $A^+$ is approximated by $A^{-1}$. Then, $a_1$ and $a_2$ may be calculated from the mathematical expressions as shown below.

$$a_1 = A^{-1}[y_{1_1}, y_{1_2}, \ldots, y_{1_N}]^T$$

$$a_2 = A^{-1}[y_{2_1}, y_{2_2}, \ldots, y_{2_N}]^T$$

In the above expressions, T represents transposition. As described above, $X_n$ and $Y_n$ are known values, and thus $A^{-1}$ may be obtained as a known matrix. In addition, $y1_1$ to $y1_N$ and $y2_1$ to $y2_N$ are the displayed coordinate positions of the marker images, and thus they are known values. Accordingly, $a_1$ and a2 may be calculated from these known values.

By the method described above, the eye-gaze detection unit 221 of the eye-gaze detection apparatus 200 may calculate the mapping coordinate value $Y_n$ using the calculated coefficients $a_1$ and $a_2$. That is, the eye-gaze detection unit 221 may estimate the gaze point $Y_{out}$ by calculating $f_1(X_{out})$ and $f_2(X_{out})$ using the pupil center $X_{out}$ obtained from the captured image.

Example 2

In the aforementioned example 1, estimation has been performed by using the user's own data at the calibration. In the example 2, description will be given of the example in which estimation of the eye-gaze position may be performed even in the case where the user's own calibration data is small.

To achieve this configuration, calibration data (data of captured images and corresponding data of coordinate position where each user gazes on the image display element 108 at capturing the image) of plural users obtained at the calibration has been stored in the memory of the eye-gaze detection apparatus 200 in advance. The calibration data closest to the actual user 30A wearing and using the head mounted display 100 is used among them, and is corrected to identify the actual gaze point. This uses the fact that eye motions of a person are usually similar to those of other person, to identify the gaze point of the user 30 by correcting calibration data of other person. To achieve this, in the example 2, calibration data of plural persons have been stored in the memory of the eye-gaze detection apparatus 200 in advance, captured images of the eyes of the user 30 gazing at each of the marker images displayed on two different coordinate positions are used for the user 30 actually wearing the head mounted display 100, and thereby the time for calibration may be shortened in comparison with the case where calibration is performed for nine marker images. Hereinbelow, detailed description will be given of the method.

The coordinate value of the first pupil center firstly observed on the captured image and the coordinate value of the displayed position of the marker image are given as ($X_1$, $Y_1$). Then, if $h_j(X', Y)=0$, the conversion function may be expressed as below.

$$\Delta X = X_1 - X'_1$$

Meanwhile, the coordinate value of the displayed position of the second pupil center and the coordinate value of the displayed position of the marker image are given as ($X_2$, $Y_2$). At this time, these coordinate values are thought to satisfy the following mathematical expression.

$$\begin{bmatrix} \lambda_1 & 0 \\ 0 & \lambda_2 \end{bmatrix} \begin{bmatrix} f_1(X_2) \\ f_2(X_2) \end{bmatrix} = \begin{bmatrix} y_{2_1} \\ y_{2_2} \end{bmatrix}$$

If there is no error in the coordinate value of the marker image, the conversion coefficient $\lambda$ becomes 1. The conversion coefficient $\lambda$ is a coefficient for correcting calibration data of other person to use them as those of the user 30.

In the case where conversion (identification of the gaze point) from the captured pupil center to the mapping position on the image display element 108 has been performed using the single calibration data in advance, there is a possibility that the gaze point may not be identified with accuracy even by using the optimization and may be deviated. To ensure further accuracy, the calibration data most suitable for the user 30 wearing the head mounted display 100 is chosen from calibration data of plural persons, and thereby the deviation is reduced.

(Condition 1)

The conversion coefficient after the aforementioned optimization is close to one if the most suitable calibration data have been chosen. That is, the following mathematical expression is satisfied.

$$\Sigma_{i=1,2} |\lambda_i - 1|^2 = 0$$

(Condition 2)

The conversion error when the conversion is performed for obtaining the gaze point gazing at each of the two marker images by using the conversion coefficient after the aforementioned optimization is minimized (closest to zero). That is, the following mathematical expression is satisfied.

$$\sum_{i=1,2} \left\| \begin{bmatrix} f_1(X_j) \\ f_2(X_j) \end{bmatrix} - Y_j \right\|^2 = 0$$

(Condition 3)

The error between the estimated coordinate position of the pupil center and the coordinate position of the converted pupil center is minimized (closest to zero). In other words, the following mathematical expression is satisfied.

$$\Sigma_{j=1,2} \|X'_j - X'_{jout}\|^2 = 0$$

By using the above three conditions, the calibration data satisfying the aforementioned three conditions are chosen from among the plural calibration data. In other words, the calibration data satisfying the following mathematical expression is specified.

$$\sum_{i=1,2} |\lambda_i - 1|^2 + \sum_{j \in 1,2} \left\| \begin{bmatrix} f_1(X_j) \\ f_2(X_j) \end{bmatrix} - Y_j \right\|^2 + \sum_{j \in 1,2} \|X'_j - X'_{jout}\|^2 = 0$$

The eye-gaze detection unit 221 of the eye-gaze detection apparatus 200 chooses the calibration data closest to those of the user 30 from among the plural calibration data, and multiplies the chosen calibration data by the aforementioned conversion coefficient to perform eye-gaze detection.

Note that the calibration data closest to the user 30 is chosen by using the three condition here, but the conditions are not limited to them. For example, only one or two of the aforementioned conditions 1 to 3 may be used for choosing the calibration data closest to those of the user 30.

As described above, in the case of the example 2, eye-gaze detection may be performed while the number of calibration for the user wearing and using the head mounted display 100 is reduced as much as possible. Accordingly, for example, start time of game play using the head mounted display 100 is moved up in comparison with the case of the calibration is fully performed, as well as reduction in time and workload for calibration.

In the case where the calibration data most suitable for the user 30 is chosen from among the plural calibration data, following configuration will be considered. Similar calibration data may be grouped so that plural groups are formed, the representative calibration data may be set for each group, the group closest to the user may be specified among these groups firstly, and then the calibration data closest to the user 30 may be chosen from among the calibration data included in the specified group.

Example 3

In the aforementioned example 1 and example 2, description has been given of the calculation method of the mapping coordinate position in the case where the calibration is performed when the HMD (head mounted display) mounted to the user is fixed. In the example 3, description will be given of a case where the HMD is not fixed. In the example 3, the calibration with the following condition should be performed as a premise.

In the calibration in the example 3, for each of marker images displays at four positions, the user maintains the state of gazing at one marker while slightly shifting the head mounted display 100 actually, and the state is captured. As the four positions of the marker images in this case, four corners of the nine maker images in the aforementioned exemplary embodiment 1 are preferably used. In capturing images, captured images corresponding to the predetermined number of frames (for example, 100 frames) are obtained so that the gaze point is accurately identified even when the head mounted display is displaced. As the predetermined number of frames, the number of the frames enough to specify the gaze point is obtained irrespective of mounting conditions of the head mounted display 100 with respect to the user 30. For each of the four images, captured images of 100 frames are obtained while the HMD is shifted, and the calibration data (data indicating a corresponding relationship among the coordinate value of the pupil center on each captured image, a coordinate value of the center of the corneal curvature, and display coordinate on the image display element 108 of each marker image at which the user has gazed at that time) are obtained. Then, the coordinate value of the gaze point on the image display element 108 is obtained from the coordinate value of the pupil center and the coordinate value of the center of the corneal curvature. Hereinbelow, description will be given of the estimation method of the gaze point in the case where such calibration is performed.

$X=\{x_1,x_2,x_3,x_4\}$, and $Y=\{y_1,y_2\}$ are given.

$(x_1, x_2)=(C_{cx}, C_{cy})$, which indicates the coordinate value of the pupil center on the image captured coordinate system. Also, $(x_3, x_4)=(P_{cx}, P_{cy})$, which indicates the coordinate value of the center of the corneal curvature on the image captured coordinate system. Further, $(y_1, y_2)=(S_x, S_y)$, which indicates the coordinate value of the pupil center on the coordinate system of the image display element 108.

On the basis of the X obtained from the captured image, the conversion functions g1 and g2 which convert X into the coordinate values on the coordinate system of the image display element 108, that is, $g_1(X)=y_1$, and $g_2(x)=y_2$ are expressed as the following polynomial expressions each composed of fourteen terms of the second degree.

$g_1(X)=b_{1_1}x_1^2+b_{1_2}x_2^2+b_{1_3}x_3^2+b_{1_4}x_4^2+b_{1_5}x_1x_2+b_{1_6}x_1x_3+b_{1_7}x_1x_4+b_{1_8}x_2x_3+b_{1_9}x_2x_4+b_{1_{10}}x_3x_4+b_{1_{11}}x_1+b_{1_{12}}x_2+b_{1_{13}}x_3+b_{1_{14}}x_4$ $g_2(X)=b_{2_1}x_1^2+b_{2_2}x_2^2+b_{2_3}x_3^2+b_{2_4}x_4^2+b_{2_5}x_1x_2+b_{2_6}x_1x_3+b_{2_7}x_1x_4+b_{2_8}x_2x_3+b_{2_9}x_2x_4+b_{2_{10}}x_3x_4+b_{2_{11}}x_1+b_{2_{12}}x_2+b_{2_{13}}x_3+b_{2_{14}}x_4$

In the aforementioned mathematical expressions, unknown coefficients b1 and b2 are expressed as below.

$b_1=[b_{1_1},b_{1_2},b_{1_3},b_{1_4},b_{1_5},b_{1_6},b_{1_7},b_{1_8},b_{1_9},b_{1_{10}},b_{1_{11}},b_{1_{12}},b_{1_{13}},b_{1_{14}}]^T$ $b_2=[b_{2_1},b_{2_2},b_{2_3},b_{2_4},b_{2_5},b_{2_6},b_{2_7},b_{2_8},b_{2_9},b_{2_{10}},b_{2_{11}},b_{2_{12}},b_{2_{13}},b_{2_{14}}]^T$

In the aforementioned mathematical expressions, T represents transposition.

To determine the coefficients, the least-square method is used to calculate them.

That is, the following two expression are used to perform calculation.

$Ab_1=[y_{1_1},y_{1_2},\ldots,y_{1_N}]^T$ $Ab_2=[y_{2_1},y_{2_2},\ldots,y_{2_N}]^T$ Here, the matrix A is the matrix of N×14. The matrix A may be expressed as below, upon giving Xn and Yn (0<n≤N) obtained by the observation.

$$A=\begin{bmatrix} x_{1_1}^2 & x_{2_1}^2 & x_{3_1}^2 & x_{4_1}^2 & x_{1_1}x_{2_1} & x_{1_1}x_{3_1} & x_{1_1}x_{4_1} & x_{2_1}x_{3_1} & x_{2_1}x_{4_1} & x_{3_1}x_{4_1} & x_{1_1} & x_{2_1} & x_{3_1} \\ \vdots & \vdots & \vdots & \vdots & \vdots & \vdots & \vdots & \vdots & \vdots & \vdots & \vdots & \vdots & \vdots \\ x_{1_N}^2 & x_{2_N}^2 & x_{3_N}^2 & x_{4_N}^2 & x_{1_N}x_{2_N} & x_{1_N}x_{3_N} & x_{1_N}x_{4_N} & x_{2_N}x_{3_N} & x_{2_N}x_{4_N} & x_{3_N}x_{4_N} & x_{1_N} & x_{2_N} & x_{3_N} \end{bmatrix}$$

The matrix A is decomposed, and the pseudo inverse matrix $A^+$ is approximated by $A^{-1}$. Then, $b_1$ and $b_2$ may be calculated from the following mathematical expressions.

$b_1=A^{-1}[y_{1_1},y_{1_2},\ldots,y_{1_N}]^T$ $b_2=A^{-1}[y_{2_1},y_{2_2},\ldots,y_{2_N}]^T$ From the above, $b_1$ and $b_2$ may be calculated on the basis of the known values. Thus, if the mounting state of the head mounted display is displaced, the gaze point may be identified with accuracy by using the coordinate Y of the image display element 108 and the aforementioned conversion expressions g1 and g2 on the basis of X obtained from the captured images (the coordinate value of pupil center and the coordinate value of the center of corneal curvature).

Further, the estimated pupil center ($P_c'$) may be calculated from the following mathematical expression by using an object function $h_f$ as long as the information on the coordinate value of the corneal curvature exists.

$h_f(P'_C,Y)=\Sigma_{i=1,2}(f_i(P'_C)-y_i)^2$

Then, the coordinate value of the gaze point on the image display element 108 may be estimated as shown in the following mathematical expression by using the aforementioned function f even if the coordinate of the center of the corneal curvature is not obtained.

$\Delta P_C=P_{C_{in}}-P'_{C_{in}}$ $P'_{C_{out}}=P_{C_{out}}-\Delta P_C$ $f(P'_{C_{out}})=S_{out}$ As described above, the correction may be performed by obtaining the correspondence relationship between the four coordinate values on the image display element 108 and the captured images. In the calibration of the example 3, the user performs the calibration while shifting the head mounted display actually, and thereby the calibration data in which the displaced state is simulated may be obtained. Thus, if the mounting state of the head mounted display varies in actual use, the displacement is canceled and the gaze point may be identified.

Example 4

In the example 4, a modified example of the aforementioned example 3 is shown. In the example 4, displacement detection of the example 3 is simplified, and the method in which the gaze point is identified upon cancellation of the displacement of the mounting of the head mounting display using the calibration data of other person is shown, similarly to the example 2. In the example 4, description will be given of the method in which the center of the corneal curvature is optimized from the obtained pupil center and its mapping coordinates on the image display element 108. This is because the center of the corneal curvature with respect to the pupil center differs in individuals. Thus, in the case of using the calibration data of other person, correction of the center of the corneal curvature is necessary.

The calibration in the example 4 is achieved by moving the marker images so that the pupil center of the user 30 is located at the center between the light points from the respective two light sources located on the right and left, and setting the screen coordinate. In this case, major marker images are displayed, the locations thereof are adjusted, and the screen coordinate system is set.

The object function hg to optimize the conversion coefficient converting the center of the corneal curvature is obtained by using any calibration data g(X) used in the eye-gaze detection.

$h_g(x'_1,x'_2,x_3,x_4,Y)=\Sigma_{i=1,2}(g_i(x'_1,x'_2,x_3,x_4)-y_i)^2$

In the above mathematical expression, $(x_1', x_2')$ may be calculated from the known values, $x_3, x_4, y_1$, and $y_2$, if hg=0. Specifically, the conversion coefficient may be given below.

$$\lambda_1 = \frac{x_1'}{x_1}$$

$$\lambda_2 = \frac{x_2'}{x_2}$$

In these expressions, $\lambda_1$ and $\lambda_1$ satisfy the equations shown below.

$$x'_{1_{out}} = \lambda_1 x_{1_{out}}$$

$$x'_{2_{out}} = \lambda_2 x_{2_{out}}$$

The gaze point on the image display element 108 may be calculated finally by using the following mathematical expression with the calculated $\lambda_1$ and $\lambda_2$.

$$\begin{bmatrix} g_1(x'_{1_{out}}, x'_{2_{out}}, x_{3_{out}}, x_{4_{out}}) \\ g_2(x'_{1_{out}}, x'_{2_{out}}, x_{3_{out}}, x_{4_{out}}) \end{bmatrix} = Y_{out}$$

Note that, in the case where the measurement is performed for plural (n) markers, the following equation is established, and the gaze point may be identified by calculating the unknown coefficients $\lambda_1$ and $\lambda_2$ similarly to the above.

$$h_g(x'_1, x'_2, x_3, x_4, Y) = \Sigma_{n=1} \Sigma_{i=1,2} (g_i(x'_{n1}, x'_{n2}, x_{n3}, x_{n4}) - y_{ni})^2$$

Note that, by combining the various examples shown here, the identification of the gaze point and correction with respect to the gaze point of the displacement at wearing may be achieved. Specifically, the example 1 and the example 2 are the methods for identifying the gaze point, and the example 3 and the example 4 show the identification methods of the gaze point in which displacement is detected and the resultant displacement is taken into consideration. Thus, the following combinations are necessary in practical use.

That is, the following combinations are considered in practical use:

(Example 1)+(Example 3),
(Example 2)+(Example 3),
(Example 1)+(Example 4), and
(Example 2)+(Example 4).

The combination of the example 1 and the example 3 may achieve the eye gaze detection with highest accuracy, because the gaze point may be identified by focusing on the specific user. That is, this is the most suitable usage in the case where the head mounted display 100 is used personally. It is the combination of the example 2 and the example 4 that shortens the time for the calibration most. The calibration in this case is most suitable for such a situation in which the head mounted display 100 is used by plural users in short time, for example, an event in which the head mounted display 100 is used.

<Supplement>

The eye-gaze detection system according to this invention is not limited to the aforementioned exemplary embodiment, but may be performed by another method to achieve the gist of this invention, as a matter of course. Hereinbelow, description will be given of various modified examples.

(1) In the aforementioned exemplary embodiment, the positions where the marker images (bright spots) are displayed are one example, and they are not limited to those shown in the exemplary embodiment as long as they are displayed on different positions to perform eye-gaze detection for the user, images of the user's eye gazing at the respective marker images are obtained, and the center of the user's eye at each time is specified, as a matter of course. Further, the number of the marker images to be displayed is not limited to nine. Since it is only necessary to establish four equations in order to specify the four elements of the aforementioned matrix x, it is enough to specify the center of the cornea of the user for each of at least four marker images.

(2) In the aforementioned exemplary embodiment, the image reflected on the hot mirror 112 is captured by the technique to capture the eye of the user 300 in order to detect the eye-gaze of the user 300. However, the eye of the user 300 may be directly captured without the hot mirror 112.

(3) In the aforementioned exemplary embodiment, the step S1202 and the step S1203 may be executed in parallel, or the step S1202 may be executed after the step S1203 is executed.

(4) Although not particularly specified in the aforementioned exemplary embodiment, the center of the corneal curvature of the user 300 is calculated by further specifying the third plane passing through the center of the corneal curvature using the illuminated position from the third infrared light source, so that the intersection point among the three planes passing through the center of the corneal curvature is obtained as the center coordinates of the corneal curvature.

(5) Although the curvature of the convex lens 114 is not particularly described in the aforementioned exemplary embodiment, correction depending on the curvature of the convex lens 114 may be necessary for the position where the mapping of the vector 840 is located, in some cases. The correction may be performed if a correction function for the correction has been stored in the storing unit 228 in advance. An operator of the eye-gaze detection apparatus 200 may have executed calculation and input of a function optimized by a simulation performed in advance as the correction function. Note that if the convex lens 114 is an almost flat lens, the correction may not be essential.

(6) In the aforementioned exemplary embodiment, the vector 840 may be a vector having the opposite direction. That is, the vector 840 may be a vector from the pupil mapping 814 of the pupil center of the user 300 to the mapping 815 of the center 805 of the corneal curvature of the user 300. Even in the case of using the vector, the displacement detection unit 226 detects the displacement of the mounting state of the head mounted display 100 similarly to the case shown in the aforementioned exemplary embodiment.

(7) In the exemplary embodiment, the eye-gaze detection unit 221, the video creating unit 222, the pupil specifying unit 223, the obtaining unit 224, the vector specifying unit 225, the displacement detection unit 226, and the correction unit 227 may be achieved by one controller, that is, one processor, or plural controllers.

Figure 14:
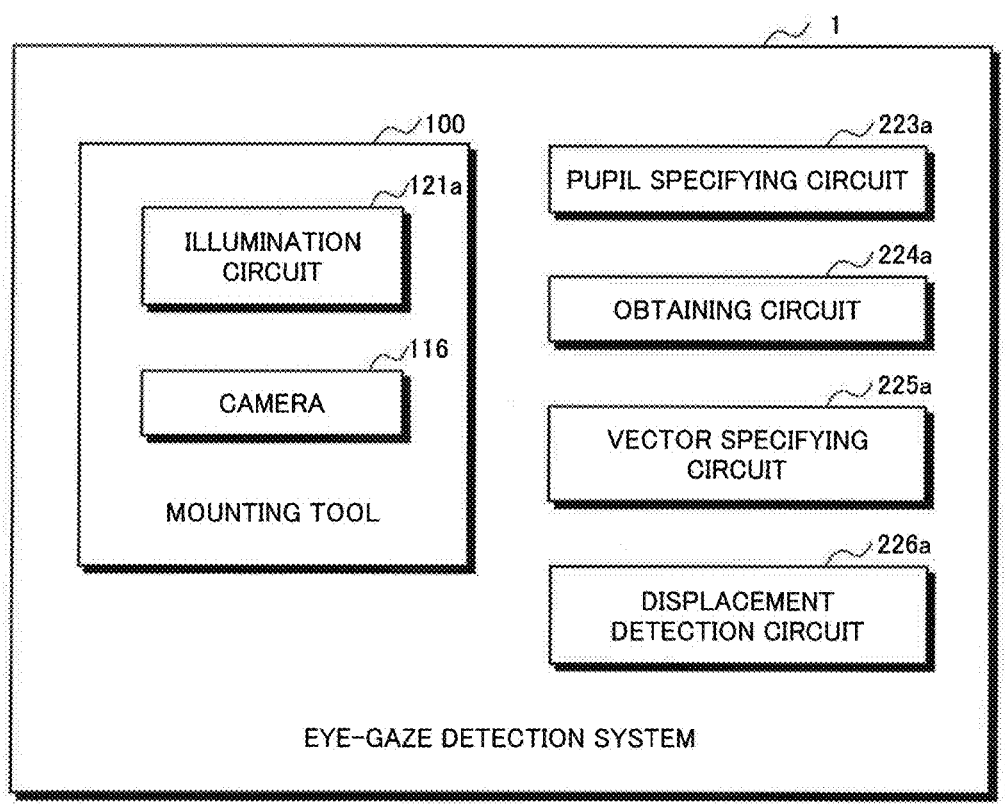
FIG. 14 is a diagram illustrating the configuration of the eye-gaze detection system.

(8) In the aforementioned exemplary embodiment, the processor of the eye-gaze detection apparatus 200 executes a displacement detection program or the like and thereby the respective points at which the user gazes are specified in the technique of displacement detection to detect the displacement of the mounting tool (head mounted display 100) mounted on a user. However, it may be achieved by a logic circuit (hardware) or a dedicated circuit formed in an integrated circuit (IC) chip, large scale integration (LSI) or the like of the eye-gaze detection apparatus 200. Each of these circuits may be formed by one or more sets of integrated circuits, or plural functional units shown in the aforementioned exemplary embodiment may be achieved by one integrated circuit. The LSI may be referred to as VLSI, super LSI, ultra LSI or the like depending on the degree of integration. That is, as shown in FIG. 14, the eye-gaze detection system 1 may be configured by an illumination circuit 121a, the camera 116, a pupil specifying circuit 223A, an obtaining circuit 224A, a vector specifying circuit 225A, and a displacement detection circuit 226A, and the respective functions thereof are the same as the corresponding units having the similar names shown in the aforementioned exemplary embodiment.

The displacement detection program may be recorded on a recording medium readable by a processor. A "non-transitory tangible medium" such as a tape, a disc, a card, a semiconductor memory, a programmable logic circuit or the like is used as the recording medium. The aforementioned displacement detection program may be provided to the aforementioned processor through any transmission medium which may transmit the displacement detection program (such as communication network or broadcast wave). This invention may be achieved by forms of data signals embedded in transmission wave, to perform the aforementioned displacement detection program through electronic transmission.

Note that the aforementioned displacement detection program may be implemented by using, for example, a script language such as ActionScript or JavaScript (registered trademark), an object-oriented language such as Objective-C or Java (registered trademark), or a markup language such as HTML5.

The eye-gaze detection method according to this invention may be a method for eye-gaze detection using an eye-gaze detection system including a head mounted display mounted on a user for use and an eye-gaze detection apparatus that detects eye-gaze of the user. In the method, the eye-gaze detection apparatus may output marker images to the head mounted display, the head mounted display may display the marker images, capture an eye of the user gazing at each marker image, and output the image containing the captured user's eye to the eye-gaze detection apparatus, and the eye-gaze detection apparatus may create a synthesized image in which the marker images and the image containing the captured user's eye gazing at each marker image are overlapped, and output the created synthesized image.

(9) The configuration shown in the aforementioned exemplary embodiment and any of the supplements may be combined appropriately.

REFERENCE SIGNS LIST

1: eye-gaze detection system, 100: head mounted display, 103a: infrared light source (second infrared light illumination unit), 103b: infrared light source (first infrared light illumination unit), 105: bright spot, 108: image display element, 112: hot mirror, 114, 114a, 114b: convex lens, 116: camera, 118: first communication unit, 120: display unit, 121: illumination unit, 122: image capturing unit, 123: image processing unit, 130: image display system, 150: housing, 152a, 152b: lens holder, 160: fitting tool, 170: headphone, 200: eye-gaze detection apparatus, 220: second communication unit 221: eye-gaze detection unit, 222: video creating unit, 223: pupil specifying unit, 224: obtaining unit, 225: vector specifying unit, 226: displacement detection unit, 227: correction unit, 228: storing unit

What is claimed is:

1. An eye-gaze detection system containing a mounting tool mounted on a user for use, comprising:
    a plurality of illumination units configured to illuminate an eye of the user with invisible light;
    a camera configured to capture the eye of the user on the basis of the invisible light;
    a processor configured to:
        specify a pupil center of the user from a captured image that has been captured by the camera;
        obtain information on a position of a center of a corneal curvature of the user on the basis of disposed positions of the plurality of illumination units, illuminated positions by illumination light emitted from the plurality of illumination units to the eye of the user, and a disposed position of the camera;
        specify a vector connecting the center of the corneal curvature of the user and the pupil center on the captured image; and
        detect displacement of a mounting state of the mounting tool mounted on the user on the basis of the vector; and
    a non-transitory computer readable recording medium configured to store disposed information indicating disposed positions of the plurality of illumination units and the camera, wherein
    the processor obtains the information on the position of the center of the corneal curvature of the user on the basis of disposed information of a first illumination unit among the plurality of the illumination units stored in the non-transitory computer readable recording medium, a first illuminated position with respect to the eye of the user illuminated by the first illumination unit with invisible light, disposed information of a second illumination unit different from the first illumination unit among the plurality of illumination units stored in the non-transitory computer readable recording medium, second illuminated position with respect to the eye of the user illuminated by the second illumination unit with invisible light, and the disposed position of the camera, and
    wherein the processor obtains, as the information on the position of the center of the corneal curvature of the user, an intersection line between a first plane and a second plane, the first plane containing a first vector from a center position of the camera to the first illumination unit and a second vector from the center position of the camera to the first illuminated position, the second plane containing a third vector from the center position of the camera to the second illumination unit and a fourth vector from the center position of the camera to the second illuminated position.

2. The eye-gaze detection system according to claim 1, wherein the processor specifies the vector by setting an intersection point between the intersection line and an image sensor of the camera as the center of the corneal curvature of the user on the captured image.

3. The eye-gaze detection system according to claim 1, wherein the processor detects displacement in a case where a position of the first vector specified as the vector at first time by the processor and a position of the second vector specified as the vector by the processor at second time within predetermined time from the first time are located on different positions.

4. The eye-gaze detection system according to claim 1, wherein
    the mounting tool is a head mounted display, and the eye-gaze detection system further comprises an eye-gaze detection apparatus, wherein the mounting tool comprises:
   the plurality of illumination units;
   the camera; and
   a transmission unit configured to transmit the captured image to the eye-gaze detection apparatus, and the eye-gaze detection apparatus comprises:
   a receiving unit configured to receive the captured image; and
   the processor.

5. The eye-gaze detection system according to claim 4, wherein
   the mounting tool further comprises a display unit configured to present an image to a user, and
   the eye-gaze detection apparatus further comprises an eye-gaze detection unit configured to detect a gaze position of the user gazing at the image on the basis of the captured image.

6. The eye-gaze detection system according to claim 5, wherein the processor of the eye-gaze detection apparatus is further configured to correct the gaze position of the user detected by the eye-gaze detection unit, on the basis of the displacement detected by the processor.

7. A displacement detection method comprising:
   illuminating an eye of a user with invisible light by a plurality of illumination units;
   capturing the eye of the user on the basis of the invisible light using a camera;
   specifying a pupil center of the user from a captured image in the capturing;
   obtaining information on a position of a center of a corneal curvature of the user on the basis of disposed positions of the plurality of illumination units, illuminated positions by illumination light emitted from the plurality of illumination units to the eye of the user, and a disposed position of the camera;
   specifying a vector connecting the center of the corneal curvature of the user and the pupil center on the captured image;
   detecting displacement of a mounting state of the mounting tool mounted on the user on the basis of the vector; and
   storing disposed information indicating disposed positions of the plurality of illumination units and the camera, wherein
   the obtaining information comprises obtaining the information on the position of the center of the corneal curvature of the user on the basis of disposed information of a first illumination unit among the plurality of the illumination units stored in the storing unit, a first illuminated position with respect to the eye of the user illuminated by the first illumination unit with invisible light, disposed information of a second illumination unit different from the first illumination unit among the plurality of illumination units stored in the storing unit, second illuminated position with respect to the eye of the user illuminated by the second illumination unit with invisible light, and the disposed position of the camera, and
   the obtaining information comprises obtaining, as the information on the position of the center of the corneal curvature of the user, an intersection line between a first plane and a second plane, the first plane containing a first vector from a center position of the camera to the first illumination unit and a second vector from the center position of the camera to the first illuminated position, the second plane containing a third vector from the center position of the camera to the second illumination unit and a fourth vector from the center position of the camera to the second illuminated position.

8. A non-transitory computer readable recording medium storing displacement detection program code instructions that are for displacement detection, and when the displacement detection program code instructions are executed by a computer, the displacement detection program code instructions cause the computer to perform:
   obtaining a captured image that has been captured by a camera configured to capture an eye of the user, on the basis of invisible light with which the eye of the user is illuminated by a plurality of illumination units;
   specifying a pupil center of the user from the captured image;
   obtaining information on a position of a center of a corneal curvature of the user on the basis of disposed positions of the plurality of illumination units, illuminated positions by illumination light emitted from the plurality of illumination units to the eye of the user and a disposed position of the camera;
   specifying a vector connecting the center of the corneal curvature of the user and the pupil center on the captured image;
   detecting displacement of a mounting state of the mounting tool mounted on the user, on the basis of the vector; and
   storing disposed information indicating disposed positions of the plurality of illumination units and the camera, wherein
   the obtaining information comprises obtaining the information on the position of the center of the corneal curvature of the user on the basis of disposed information of a first illumination unit among the plurality of the illumination units stored in the storing unit, a first illuminated position with respect to the eye of the user illuminated by the first illumination unit with invisible light, disposed information of a second illumination unit different from the first illumination unit among the plurality of illumination units stored in the storing unit, second illuminated position with respect to the eye of the user illuminated by the second illumination unit with invisible light, and the disposed position of the camera, and
   the obtaining information comprises obtaining, as the information on the position of the center of the corneal curvature of the user, an intersection line between a first plane and a second plane, the first plane containing a first vector from a center position of the camera to the first illumination unit and a second vector from the center position of the camera to the first illuminated position, the second plane containing a third vector from the center position of the camera to the second illumination unit and a fourth vector from the center position of the camera to the second illuminated position.

* * * * *